US012461630B2

(12) United States Patent
Andersson et al.

(10) Patent No.: US 12,461,630 B2
(45) Date of Patent: *Nov. 4, 2025

(54) TOUCH-SENSING APPARATUS

(71) Applicant: FlatFrog Laboratories AB, Lund (SE)

(72) Inventors: David Andersson, Malmö (SE); Mattias Krus, Lund (SE)

(73) Assignee: FlatFrog Laboratories AB, Lund (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/752,044

(22) Filed: Jun. 24, 2024

(65) Prior Publication Data
US 2024/0427460 A1 Dec. 26, 2024

Related U.S. Application Data

(63) Continuation of application No. 17/756,149, filed as application No. PCT/SE2020/051117 on Nov. 24, 2020, now Pat. No. 12,056,316.

(30) Foreign Application Priority Data

Nov. 25, 2019 (SE) .................................... 1930383-3

(51) Int. Cl.
G06F 3/042 (2006.01)
(52) U.S. Cl.
CPC ................................. G06F 3/0428 (2013.01)
(58) Field of Classification Search
CPC .................. G06F 3/0428; G06F 3/0421; G06F 2203/04105
See application file for complete search history.

(56) References Cited

U.S. PATENT DOCUMENTS 3,375,053 A 3/1968 Ward
3,440,426 A 4/1969 Bush
(Continued)

FOREIGN PATENT DOCUMENTS

AU 2008280952 A1 3/2009
AU 2014201966 A1 4/2014
(Continued)

OTHER PUBLICATIONS

Supplementary European Search Report for European App. No. EP 16759213, dated Oct. 4, 2018, in 9 pages.
(Continued)

Primary Examiner — Ibrahim A Khan
(74) Attorney, Agent, or Firm — Knobbe Martens Olson & Bear LLP

(57) ABSTRACT

A touch sensing apparatus is disclosed for detecting touch pressure, comprising a panel that defines a touch surface, the panel having a perimeter, a plurality of emitters arranged along the perimeter, wherein the emitters emit light across the panel, a plurality of detectors arranged along the perimeter, whereby the detectors are arranged to receive at least part of said light as detection light, wherein the touch sensing apparatus is configured to determine, as a touch object deflects the panel along a normal of the touch surface, a difference in the received detection light between deflection of the panel from a first position ($p_1$) to a second position ($p_2$) along the normal, and determine a pressure of the touch object against the touch surface based on said difference.

16 Claims, 5 Drawing Sheets

(56) References Cited

U.S. PATENT DOCUMENTS

| | | | |
|---|---|---|---|
| 3,478,220 | A | 11/1969 | Milroy |
| 3,553,680 | A | 1/1971 | Cooreman |
| 3,673,327 | A | 6/1972 | Johnson et al. |
| 4,129,384 | A | 12/1978 | Walker et al. |
| 4,180,702 | A | 12/1979 | Hartmann et al. |
| 4,209,255 | A | 6/1980 | Heynau et al. |
| 4,213,707 | A | 7/1980 | Evans, Jr. |
| 4,254,333 | A | 3/1981 | Bergstroem |
| 4,254,407 | A | 3/1981 | Tipon |
| 4,294,543 | A | 10/1981 | Apple et al. |
| 4,346,376 | A | 8/1982 | Mallos |
| 4,420,261 | A | 12/1983 | Barlow et al. |
| 4,459,476 | A | 7/1984 | Weissmueller et al. |
| 4,484,179 | A | 11/1984 | Kasday |
| 4,507,557 | A | 3/1985 | Tsikos |
| 4,521,112 | A | 6/1985 | Kuwabara et al. |
| 4,542,375 | A | 9/1985 | Alles et al. |
| 4,550,250 | A | 10/1985 | Mueller et al. |
| 4,593,191 | A | 6/1986 | Alles |
| 4,673,918 | A | 6/1987 | Adler et al. |
| 4,688,933 | A | 8/1987 | Lapeyre |
| 4,688,993 | A | 8/1987 | Ferris et al. |
| 4,692,809 | A | 9/1987 | Beining et al. |
| 4,710,760 | A | 12/1987 | Kasday |
| 4,736,191 | A | 4/1988 | Matzke et al. |
| 4,737,626 | A | 4/1988 | Hasegawa |
| 4,746,770 | A | 5/1988 | McAvinney |
| 4,751,379 | A | 6/1988 | Sasaki et al. |
| 4,752,655 | A | 6/1988 | Tajiri et al. |
| 4,766,424 | A | 8/1988 | Adler et al. |
| 4,772,763 | A | 9/1988 | Garwin et al. |
| 4,782,328 | A | 11/1988 | Denlinger |
| 4,812,833 | A | 3/1989 | Shimauchi |
| 4,820,050 | A | 4/1989 | Griffin |
| 4,837,430 | A | 6/1989 | Hasegawa |
| 4,868,550 | A | 9/1989 | Sasaki et al. |
| 4,868,912 | A | 9/1989 | Doering |
| 4,891,829 | A | 1/1990 | Deckman et al. |
| 4,916,308 | A | 4/1990 | Meadows |
| 4,916,712 | A | 4/1990 | Bender |
| 4,933,544 | A | 6/1990 | Tamaru |
| 4,949,079 | A | 8/1990 | Loebner |
| 4,986,662 | A | 1/1991 | Bures |
| 4,988,983 | A | 1/1991 | Wehrer |
| 4,994,677 | A | 2/1991 | Graindorge |
| 5,065,185 | A | 11/1991 | Powers et al. |
| 5,073,770 | A | 12/1991 | Lowbner |
| 5,105,186 | A | 4/1992 | May |
| 5,115,677 | A | 5/1992 | Martin et al. |
| 5,155,813 | A | 10/1992 | Donoghue et al. |
| 5,159,322 | A | 10/1992 | Loebner |
| 5,162,783 | A | 11/1992 | Moreno |
| 5,166,668 | A | 11/1992 | Aoyagi |
| 5,175,030 | A | 12/1992 | Lu et al. |
| 5,227,622 | A | 7/1993 | Suzuki |
| 5,248,856 | A | 9/1993 | Mallicoat |
| 5,254,407 | A | 10/1993 | Sergerie et al. |
| 5,345,490 | A | 9/1994 | Finnigan et al. |
| 5,383,022 | A | 1/1995 | Kaser |
| 5,414,413 | A | 5/1995 | Tamaru et al. |
| 5,434,373 | A | 7/1995 | Komaki |
| 5,483,261 | A | 1/1996 | Yasutake |
| 5,484,966 | A | 1/1996 | Segen |
| 5,499,098 | A | 3/1996 | Ogawa |
| 5,502,568 | A | 3/1996 | Ogawa et al. |
| 5,515,083 | A | 5/1996 | Casebolt et al. |
| 5,525,764 | A | 6/1996 | Junkins et al. |
| 5,526,422 | A | 6/1996 | Keen |
| 5,539,514 | A | 7/1996 | Shishido et al. |
| 5,543,591 | A | 8/1996 | Gillespie et al. |
| 5,570,181 | A | 10/1996 | Yasuo et al. |
| 5,572,251 | A | 11/1996 | Ogawa |
| 5,577,501 | A | 11/1996 | Flohr et al. |
| 5,600,105 | A | 2/1997 | Fukuzaki et al. |
| 5,605,406 | A | 2/1997 | Bowen |
| 5,608,550 | A | 3/1997 | Epstein et al. |
| 5,672,852 | A | 9/1997 | Fukuzaki et al. |
| 5,677,082 | A | 10/1997 | Greinke et al. |
| 5,679,930 | A | 10/1997 | Katsurahira |
| 5,686,942 | A | 11/1997 | Ball |
| 5,688,933 | A | 11/1997 | Evans et al. |
| 5,729,249 | A | 3/1998 | Yasutake |
| 5,729,250 | A | 3/1998 | Bishop et al. |
| 5,736,686 | A | 4/1998 | Perret et al. |
| 5,740,224 | A | 4/1998 | Mueller et al. |
| 5,746,423 | A | 5/1998 | Arov |
| 5,764,223 | A | 6/1998 | Chang et al. |
| 5,767,517 | A | 6/1998 | Hawkins |
| 5,775,792 | A | 7/1998 | Wiese |
| 5,808,606 | A | 9/1998 | Kodama et al. |
| 5,945,980 | A | 8/1999 | Moissev et al. |
| 5,945,981 | A | 8/1999 | Paull et al. |
| 5,959,617 | A | 9/1999 | Bird et al. |
| 6,031,524 | A | 2/2000 | Kunert |
| 6,061,177 | A | 5/2000 | Fujimoto |
| 6,067,079 | A | 5/2000 | Shieh |
| 6,072,450 | A | 6/2000 | Yamada et al. |
| 6,100,538 | A | 8/2000 | Ogawa |
| 6,122,394 | A | 9/2000 | Neukermans et al. |
| 6,130,663 | A | 10/2000 | Null |
| 6,141,104 | A | 10/2000 | Schulz et al. |
| 6,172,667 | B1 | 1/2001 | Sayag |
| 6,175,999 | B1 | 1/2001 | Sloan et al. |
| 6,227,667 | B1 | 5/2001 | Halldorsson et al. |
| 6,229,529 | B1 | 5/2001 | Yano et al. |
| 6,315,156 | B1 | 11/2001 | Mahoney et al. |
| 6,333,735 | B1 | 12/2001 | Anvekar |
| 6,340,967 | B1 | 1/2002 | Maxted |
| 6,366,276 | B1 | 4/2002 | Kunimatsu et al. |
| 6,380,732 | B1 | 4/2002 | Gilboa |
| 6,380,740 | B1 | 4/2002 | Laub |
| 6,390,370 | B1 | 5/2002 | Plesko |
| 6,429,857 | B1 | 8/2002 | Masters et al. |
| 6,452,996 | B1 | 9/2002 | Hsieh |
| 6,476,797 | B1 | 11/2002 | Kurihara et al. |
| 6,480,187 | B1 | 11/2002 | Sano et al. |
| 6,492,633 | B2 | 12/2002 | Nakazawa et al. |
| 6,495,832 | B1 | 12/2002 | Kirby |
| 6,504,143 | B2 | 1/2003 | Koops et al. |
| 6,504,530 | B1 | 1/2003 | Wilson et al. |
| 6,524,749 | B1 | 2/2003 | Kaneda et al. |
| 6,529,327 | B1 | 3/2003 | Graindorge |
| 6,535,213 | B1 | 3/2003 | Ogino et al. |
| 6,538,644 | B1 | 3/2003 | Muraoka |
| 6,587,099 | B2 | 7/2003 | Takekawa |
| 6,648,485 | B1 | 11/2003 | Colgan et al. |
| 6,660,964 | B1 | 12/2003 | Benderly |
| 6,664,498 | B2 | 12/2003 | Forsman et al. |
| 6,664,952 | B2 | 12/2003 | Iwamoto et al. |
| 6,677,934 | B1 | 1/2004 | Blanchard |
| 6,690,363 | B2 | 2/2004 | Newton |
| 6,692,807 | B2 | 2/2004 | Bries et al. |
| 6,707,027 | B2 | 3/2004 | Liess et al. |
| 6,710,767 | B1 | 3/2004 | Hasegawa et al. |
| 6,738,051 | B2 | 5/2004 | Boyd et al. |
| 6,748,098 | B1 | 6/2004 | Rosenfeld |
| 6,784,948 | B2 | 8/2004 | Kawashima et al. |
| 6,799,141 | B1 | 9/2004 | Stoustrup et al. |
| 6,803,900 | B1 | 10/2004 | Berkoff et al. |
| 6,806,871 | B1 | 10/2004 | Yasue |
| 6,828,959 | B2 | 12/2004 | Takekawa et al. |
| 6,911,646 | B1 | 6/2005 | Weitekamp |
| 6,927,384 | B2 | 8/2005 | Reime et al. |
| 6,940,286 | B2 | 9/2005 | Wang et al. |
| 6,965,836 | B2 | 11/2005 | Richardson |
| 6,972,401 | B2 | 12/2005 | Akitt et al. |
| 6,972,753 | B1 | 12/2005 | Kimura et al. |
| 6,985,137 | B2 | 1/2006 | Kaikuranta |
| 7,042,444 | B2 | 5/2006 | Cok |
| 7,084,859 | B1 | 8/2006 | Pryor |
| 7,087,907 | B1 | 8/2006 | Lalovic et al. |
| 7,117,157 | B1 | 10/2006 | Taylor et al. |
| 7,133,031 | B2 | 11/2006 | Wang et al. |
| 7,151,530 | B2 | 12/2006 | Roeber et al. |

(56) References Cited

U.S. PATENT DOCUMENTS

| | | |
|---|---|---|
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| D602,498 S | 10/2009 | Arnell |
| 7,613,375 B2 | 11/2009 | Shimizu |
| 7,629,968 B2 | 12/2009 | Miller et al. |
| 7,646,379 B1 | 1/2010 | Drennan et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,712,041 B2 | 5/2010 | Toyama et al. |
| 7,729,056 B2 | 6/2010 | Hwang et al. |
| 7,812,826 B2 | 10/2010 | Ording et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,956,847 B2 | 6/2011 | Christie |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu et al. |
| 8,139,046 B2 | 3/2012 | Kweon et al. |
| 8,149,211 B2 | 4/2012 | Hayakawa et al. |
| 8,149,221 B2 | 4/2012 | Newton |
| 8,154,418 B2 | 4/2012 | Peterson et al. |
| 8,184,108 B2 | 5/2012 | Smits |
| 8,194,036 B1 | 6/2012 | Braun et al. |
| 8,217,854 B2 | 7/2012 | Bhogal et al. |
| 8,218,154 B2 | 7/2012 | Østergaard et al. |
| 8,274,495 B2 | 9/2012 | Lee |
| D669,497 S | 10/2012 | Lee et al. |
| 8,314,773 B2 | 11/2012 | Low et al. |
| 8,319,729 B2 | 11/2012 | Choi et al. |
| 8,325,158 B2 | 12/2012 | Yatsuda et al. |
| 8,339,379 B2 | 12/2012 | Goertz et al. |
| 8,345,023 B1 | 1/2013 | Drennan et al. |
| 8,350,827 B2 | 1/2013 | Chung et al. |
| D675,644 S | 2/2013 | Frost et al. |
| 8,384,010 B2 | 2/2013 | Hong et al. |
| 8,384,693 B2 | 2/2013 | Newton |
| 8,407,606 B1 | 3/2013 | Davidson et al. |
| 8,436,833 B2 | 5/2013 | King et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Christiansson et al. |
| 8,542,217 B2 | 9/2013 | Wassvik et al. |
| 8,553,014 B2 | 10/2013 | Holmgren et al. |
| 8,567,257 B2 | 10/2013 | Van Steenberge et al. |
| 8,571,171 B2 | 10/2013 | Tischenko et al. |
| 8,581,884 B2 | 11/2013 | Fåhraeus et al. |
| 8,587,562 B2 | 11/2013 | Goertz et al. |
| 8,599,140 B2 | 12/2013 | Crockett et al. |
| 8,610,672 B2 | 12/2013 | Kun et al. |
| 8,624,858 B2 | 1/2014 | Fyke et al. |
| 8,674,963 B2 | 3/2014 | Cornish et al. |
| 8,676,007 B2 | 3/2014 | Holmgren et al. |
| 8,686,974 B2 | 4/2014 | Christiansson et al. |
| 8,692,807 B2 | 4/2014 | Foehraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,749,527 B2 | 6/2014 | Douxchamps et al. |
| 8,780,066 B2 | 7/2014 | Christiansson et al. |
| 8,830,181 B1 | 9/2014 | Clark et al. |
| 8,837,882 B2 | 9/2014 | Holmgren et al. |
| 8,860,696 B2 | 10/2014 | Wassvik et al. |
| 8,866,870 B1 | 10/2014 | Smith |
| 8,872,098 B2 | 10/2014 | Bergström et al. |
| 8,872,801 B2 | 10/2014 | Bergstrom et al. |
| D716,820 S | 11/2014 | Wood |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,896,575 B2 | 11/2014 | Goertz et al. |
| 8,902,196 B2 | 12/2014 | Goertz et al. |
| 8,913,035 B2 | 12/2014 | Lai et al. |
| 8,922,526 B2 | 12/2014 | Wang |
| 8,928,590 B1 | 1/2015 | El Dokor |
| 8,928,609 B2 | 1/2015 | Italia et al. |
| 8,963,886 B2 | 2/2015 | Wassvik |
| 8,982,084 B2 | 3/2015 | Christiansson et al. |
| 9,001,086 B1 | 4/2015 | Saini |
| 9,024,896 B2 | 5/2015 | Chen |
| 9,024,916 B2 | 5/2015 | Christiansson |
| 9,025,855 B1 | 5/2015 | Christoph et al. |
| 9,035,909 B2 | 5/2015 | Christiansson |
| 9,052,771 B2 | 6/2015 | Goertz et al. |
| 9,063,614 B2 | 6/2015 | Pettersson et al. |
| 9,063,617 B2 | 6/2015 | Eliasson et al. |
| 9,086,763 B2 | 7/2015 | Johansson et al. |
| 9,092,091 B2 | 7/2015 | Piot et al. |
| 9,092,094 B1 | 7/2015 | Baldwin |
| 9,128,250 B2 | 9/2015 | Charters et al. |
| 9,134,854 B2 | 9/2015 | Wassvik et al. |
| 9,137,891 B2 | 9/2015 | Gibbs et al. |
| 9,158,401 B2 | 10/2015 | Christiansson et al. |
| 9,158,415 B2 | 10/2015 | Song et al. |
| 9,158,416 B2 | 10/2015 | Eriksson et al. |
| 9,164,625 B2 | 10/2015 | Holmgren et al. |
| 9,195,344 B2 | 11/2015 | Goertz et al. |
| 9,201,520 B2 | 12/2015 | Benko et al. |
| 9,207,800 B1 | 12/2015 | Eriksson et al. |
| 9,213,443 B2 | 12/2015 | Goertz et al. |
| 9,213,445 B2 | 12/2015 | King et al. |
| 9,223,441 B1 | 12/2015 | Bohn |
| 9,274,645 B2 | 3/2016 | Christiansson et al. |
| 9,280,237 B2 | 3/2016 | Kukulj |
| 9,291,845 B2 | 3/2016 | Shin et al. |
| 9,292,132 B2 | 3/2016 | An et al. |
| 9,317,146 B1 | 4/2016 | Hufnagel |
| 9,317,168 B2 | 4/2016 | Christiansson et al. |
| 9,318,156 B2 | 4/2016 | Kanapathippillai et al. |
| 9,323,396 B2 | 4/2016 | Han et al. |
| 9,335,867 B2 | 5/2016 | Holmgren et al. |
| 9,366,565 B2 | 6/2016 | Uvnäs |
| 9,366,802 B2 | 6/2016 | Lee et al. |
| 9,377,882 B2 | 6/2016 | Kim |
| 9,377,884 B2 | 6/2016 | Christiansson et al. |
| 9,389,730 B2 | 7/2016 | Goertz et al. |
| 9,389,732 B2 | 7/2016 | Craven-Bartle |
| 9,411,430 B2 | 8/2016 | Holmgren et al. |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| D768,674 S | 10/2016 | Hanover |
| 9,471,170 B2 | 10/2016 | Goertz et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,563,298 B2 | 2/2017 | Sakashita et al. |
| D782,516 S | 3/2017 | Höhne et al. |
| 9,588,619 B2 | 3/2017 | Christiansson et al. |
| 9,594,467 B2 | 3/2017 | Christiansson et al. |
| D783,042 S | 4/2017 | Kim et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |

(56) References Cited

U.S. PATENT DOCUMENTS

| | | |
|---|---|---|
| 9,645,679 B2 | 5/2017 | Eriksson et al. |
| 9,652,082 B1 | 5/2017 | Lin et al. |
| 9,671,900 B2 | 6/2017 | Piot et al. |
| 9,678,601 B2 | 6/2017 | Pettersson et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,720,499 B2 | 8/2017 | Han et al. |
| 9,741,184 B2 | 8/2017 | Iyer et al. |
| D798,893 S | 10/2017 | Anzures et al. |
| 9,785,287 B2 | 10/2017 | Bergstrom et al. |
| 9,811,163 B2 | 11/2017 | Eriksson et al. |
| 9,811,209 B2 | 11/2017 | Christiansson et al. |
| 9,817,510 B2 | 11/2017 | Kim |
| D807,388 S | 1/2018 | Butcher et al. |
| D808,416 S | 1/2018 | Anzures et al. |
| 9,857,916 B2 | 1/2018 | Bergström et al. |
| 9,857,917 B2 | 1/2018 | Wassvik et al. |
| 9,864,470 B2 | 1/2018 | Christiansson |
| 9,874,978 B2 | 1/2018 | Wall |
| 9,921,661 B2 | 3/2018 | Eriksson et al. |
| 9,927,921 B2 | 3/2018 | Lee |
| 9,983,626 B2 | 5/2018 | Cao et al. |
| 9,983,717 B2 | 5/2018 | Pacheco et al. |
| 9,996,196 B2 | 6/2018 | Christiansson et al. |
| 10,001,881 B2 | 6/2018 | Wallander et al. |
| 10,004,985 B2 | 6/2018 | Holmgren et al. |
| D824,412 S | 7/2018 | Anzures et al. |
| 10,013,107 B2 | 7/2018 | Christiansson et al. |
| 10,019,113 B2 | 7/2018 | Christiansson et al. |
| 10,024,741 B2 | 7/2018 | Povazay et al. |
| 10,031,623 B2 | 7/2018 | Christiansson et al. |
| 10,048,773 B2 | 8/2018 | Fahraeus et al. |
| 10,088,919 B2 | 10/2018 | Tamura |
| 10,088,957 B2 | 10/2018 | Johansson et al. |
| 10,126,882 B2 | 11/2018 | Wassvik |
| 10,126,897 B2 | 11/2018 | Kwon et al. |
| 10,139,854 B2 | 11/2018 | Krishnakumar et al. |
| 10,146,376 B2 | 12/2018 | Wassvik et al. |
| 10,151,866 B2 | 12/2018 | Craven-Bartle et al. |
| 10,152,176 B2 | 12/2018 | Wallander |
| 10,161,886 B2 | 12/2018 | Ohlsson et al. |
| D837,829 S | 1/2019 | Balles et al. |
| D838,280 S | 1/2019 | Coburn et al. |
| 10,168,835 B2 | 1/2019 | Wallander et al. |
| D842,312 S | 3/2019 | Na et al. |
| 10,261,639 B2 | 4/2019 | Lee et al. |
| 10,268,288 B1 | 4/2019 | Wang et al. |
| 10,268,319 B2 | 4/2019 | Wassvik et al. |
| 10,282,035 B2 | 5/2019 | Kocovski et al. |
| 10,317,200 B1 | 6/2019 | Han et al. |
| 10,318,041 B2 | 6/2019 | Björklund et al. |
| 10,318,074 B2 | 6/2019 | Klinghult et al. |
| 10,324,565 B2 | 6/2019 | Rosengren et al. |
| 10,324,566 B2 | 6/2019 | Christiansson |
| D852,842 S | 7/2019 | Hung et al. |
| 10,365,768 B2 | 7/2019 | Craven-Bartle et al. |
| 10,372,265 B2 | 8/2019 | Christiansson et al. |
| 10,397,638 B2 | 8/2019 | Kanematsu et al. |
| 10,401,546 B2 | 9/2019 | Craven-Bartle et al. |
| 10,417,219 B1 | 9/2019 | Yang et al. |
| 10,437,358 B2 | 10/2019 | Geaghan et al. |
| 10,437,389 B2 | 10/2019 | Skagmo et al. |
| 10,459,589 B2 | 10/2019 | Xu et al. |
| 10,459,590 B2 | 10/2019 | Lin et al. |
| 10,474,249 B2 | 11/2019 | Fahraeus et al. |
| 10,481,737 B2 | 11/2019 | Christiansson et al. |
| 10,496,227 B2 | 12/2019 | Wassvik et al. |
| 10,579,227 B1 | 3/2020 | Bura et al. |
| 10,606,414 B2 | 3/2020 | Christiansson et al. |
| 10,606,416 B2 | 3/2020 | Skagmo et al. |
| 10,642,386 B2 | 5/2020 | Makelainen et al. |
| 10,649,585 B1 | 5/2020 | van Beek et al. |
| 10,691,638 B1 | 6/2020 | Lyadvinsky et al. |
| D892,855 S | 8/2020 | Liu |
| 10,739,916 B2 | 8/2020 | Skagmo et al. |
| 10,761,657 B2 | 9/2020 | Christiansson et al. |
| 10,775,935 B2 | 9/2020 | Kocovski et al. |
| 10,775,937 B2 | 9/2020 | Christiansson et al. |
| 10,845,923 B2 | 11/2020 | Skagmo et al. |
| 10,853,315 B1 | 12/2020 | Faibish et al. |
| 10,860,142 B1 | 12/2020 | Northcott et al. |
| 10,884,275 B2 | 1/2021 | Yang et al. |
| 10,884,553 B2 | 1/2021 | Weilbacher et al. |
| 10,892,303 B2 | 1/2021 | Li |
| 10,963,104 B2 | 3/2021 | Bergström et al. |
| 11,016,605 B2 | 5/2021 | Christiansson et al. |
| 11,029,783 B2 | 6/2021 | Wassvik et al. |
| 11,099,688 B2 | 8/2021 | Christiansson et al. |
| 11,106,312 B2 | 8/2021 | Christiansson et al. |
| 11,106,314 B2 | 8/2021 | Krishnakumar et al. |
| 11,119,565 B2 | 9/2021 | Avila et al. |
| 11,175,756 B2 | 11/2021 | Andersson et al. |
| 11,182,023 B2 | 11/2021 | Ohlsson et al. |
| 11,188,730 B1 * | 11/2021 | Kwon ................. A61B 5/0075 |
| 11,243,640 B2 | 2/2022 | Ancona et al. |
| 11,256,371 B2 | 2/2022 | Bergström et al. |
| 11,263,028 B2 | 3/2022 | Momchilov |
| 11,269,460 B2 | 3/2022 | Skagmo et al. |
| 11,281,335 B2 | 3/2022 | Kocovski et al. |
| 11,281,338 B2 | 3/2022 | Skagmo et al. |
| 11,301,089 B2 | 4/2022 | Christiansson et al. |
| 11,474,644 B2 | 10/2022 | Kocovski et al. |
| 11,567,610 B2 | 1/2023 | Bergström et al. |
| 11,579,731 B2 | 2/2023 | Kocovski et al. |
| 11,579,732 B2 | 2/2023 | Skagmo et al. |
| 11,650,699 B2 | 5/2023 | Bergström et al. |
| 11,740,741 B2 | 8/2023 | Bergström et al. |
| 11,868,568 B2 | 1/2024 | Kocovski et al. |
| 11,893,189 B2 | 2/2024 | Bergström |
| 11,909,033 B2 | 2/2024 | Tsuzuki et al. |
| 11,914,819 B2 | 2/2024 | Kocovski et al. |
| 11,943,563 B2 | 3/2024 | Wassvik et al. |
| 12,055,969 B2 | 8/2024 | Svensson et al. |
| 12,086,362 B2 | 9/2024 | Bergström et al. |
| 12,135,847 B2 | 11/2024 | Andreasson |
| 12,175,044 B2 | 12/2024 | Bergström et al. |
| 12,282,653 B2 | 4/2025 | Andreasson et al. |
| 12,386,461 B2 | 8/2025 | Bergström et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2001/0055411 A1 | 12/2001 | Black |
| 2002/0067348 A1 | 6/2002 | Masters et al. |
| 2002/0075243 A1 | 6/2002 | Newton |
| 2002/0085003 A1 | 7/2002 | Nagashima |
| 2002/0118177 A1 | 8/2002 | Newton |
| 2002/0130883 A1 | 9/2002 | Huang et al. |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2002/0175901 A1 | 11/2002 | Gettemy |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0085882 A1 | 5/2003 | Lu |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0109664 A1 | 6/2004 | Ohtsuki et al. |
| 2004/0130338 A1 | 7/2004 | Wang et al. |
| 2004/0134772 A1 | 7/2004 | Cohen et al. |
| 2004/0136564 A1 | 7/2004 | Roeber et al. |
| 2004/0174541 A1 | 9/2004 | Freifeld |

(56) References Cited

U.S. PATENT DOCUMENTS

| | | |
|---|---|---|
| 2004/0179001 A1 | 9/2004 | Morrison et al. |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0005319 A1 | 1/2005 | Della-Cioppa et al. |
| 2005/0012714 A1 | 1/2005 | Russo et al. |
| 2005/0022130 A1 | 1/2005 | Fabritius |
| 2005/0024624 A1 | 2/2005 | Gruhlke et al. |
| 2005/0041013 A1 | 2/2005 | Tanaka |
| 2005/0052635 A1 | 3/2005 | Xie et al. |
| 2005/0053191 A1 | 3/2005 | Gohno et al. |
| 2005/0057522 A1 | 3/2005 | Godler |
| 2005/0057903 A1 | 3/2005 | Choi |
| 2005/0073508 A1 | 4/2005 | Pittel et al. |
| 2005/0083293 A1 | 4/2005 | Dixon |
| 2005/0092900 A1 | 5/2005 | Reime et al. |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1 | 8/2005 | Nishikawa |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0237317 A1 | 10/2005 | Cok |
| 2005/0248540 A1 | 11/2005 | Newton |
| 2005/0248848 A1 | 11/2005 | Whitehead |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0013353 A1 | 1/2006 | Hein |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0066586 A1 | 3/2006 | Gally et al. |
| 2006/0098004 A1 | 5/2006 | Cok |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0144237 A1 | 7/2006 | Liang et al. |
| 2006/0158437 A1 | 7/2006 | Blythe et al. |
| 2006/0161871 A1 | 7/2006 | Hotelling et al. |
| 2006/0164443 A1 | 7/2006 | Kettle et al. |
| 2006/0170658 A1 | 8/2006 | Nakamura et al. |
| 2006/0182345 A1 | 8/2006 | Geidl et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1 | 4/2007 | Leung et al. |
| 2007/0120833 A1 | 5/2007 | Yamaguchi et al. |
| 2007/0125937 A1 | 6/2007 | Eliasson et al. |
| 2007/0132710 A1 | 6/2007 | Tateuchi et al. |
| 2007/0146337 A1 | 6/2007 | Ording et al. |
| 2007/0152985 A1 | 7/2007 | Ostergaard et al. |
| 2007/0165008 A1 | 7/2007 | Crockett |
| 2007/0176162 A1 | 8/2007 | Kang |
| 2007/0195404 A1 | 8/2007 | Iijima |
| 2007/0201042 A1 | 8/2007 | Eliasson et al. |
| 2007/0285406 A1 | 12/2007 | Kukulj et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0012835 A1 | 1/2008 | Rimon et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0074402 A1 | 3/2008 | Cornish et al. |
| 2008/0080811 A1 | 4/2008 | Deane |
| 2008/0088603 A1 | 4/2008 | Eliasson et al. |
| 2008/0115081 A1 | 5/2008 | Sankaravadivelu et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Ren et al. |
| 2008/0133265 A1 | 6/2008 | Silkaitis et al. |
| 2008/0150846 A1 | 6/2008 | Chung |
| 2008/0150848 A1 | 6/2008 | Chung et al. |
| 2008/0150915 A1 | 6/2008 | Shibue et al. |
| 2008/0151126 A1 | 6/2008 | Yu |
| 2008/0158176 A1 | 7/2008 | Land et al. |
| 2008/0180404 A1 | 7/2008 | Han et al. |
| 2008/0189046 A1 | 8/2008 | Eliasson et al. |
| 2008/0192025 A1 | 8/2008 | Jaeger et al. |
| 2008/0198144 A1 | 8/2008 | Shimizu et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0280952 A1 | 11/2008 | Giblin et al. |
| 2008/0284925 A1 | 11/2008 | Han |
| 2008/0285406 A1 | 11/2008 | Moro et al. |
| 2008/0291668 A1 | 11/2008 | Aylward et al. |
| 2008/0297482 A1 | 12/2008 | Weiss |
| 2008/0297998 A1 | 12/2008 | Choi |
| 2008/0309626 A1 | 12/2008 | Westerman et al. |
| 2009/0000831 A1 | 1/2009 | Miller et al. |
| 2009/0002340 A1 | 1/2009 | Van Genechten |
| 2009/0006292 A1 | 1/2009 | Block |
| 2009/0013562 A1 | 1/2009 | Pelletier |
| 2009/0040786 A1 | 2/2009 | Mori |
| 2009/0058832 A1 | 3/2009 | Newton |
| 2009/0058833 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0100383 A1 | 4/2009 | Sunday et al. |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0127005 A1 | 5/2009 | Zachut et al. |
| 2009/0128499 A1 | 5/2009 | Izadi et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0174679 A1 | 7/2009 | Westerman |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0209420 A1 | 8/2009 | Kalgutkar et al. |
| 2009/0219256 A1 | 9/2009 | Newton |
| 2009/0229892 A1 | 9/2009 | Fisher et al. |

(56) References Cited

U.S. PATENT DOCUMENTS

| | | |
|---|---|---|
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0273795 A1 | 11/2009 | Bacher et al. |
| 2009/0278795 A1 | 11/2009 | Hansen et al. |
| 2009/0278816 A1 | 11/2009 | Colson |
| 2009/0278913 A1 | 11/2009 | Rosenfeld et al. |
| 2009/0295752 A1 | 12/2009 | Liu et al. |
| 2009/0297009 A1 | 12/2009 | Xu et al. |
| 2010/0007331 A1 | 1/2010 | Hawkins et al. |
| 2010/0014024 A1 | 1/2010 | Tatsumi et al. |
| 2010/0026667 A1 | 2/2010 | Bernstein |
| 2010/0033444 A1 | 2/2010 | Kobayashi |
| 2010/0038545 A1 | 2/2010 | Cavallucci et al. |
| 2010/0045629 A1 | 2/2010 | Newton |
| 2010/0045634 A1 | 2/2010 | Su et al. |
| 2010/0057235 A1* | 3/2010 | Wang .................... G06F 1/1626 715/810 |
| 2010/0059295 A1 | 3/2010 | Hotelling et al. |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0128985 A1 | 5/2010 | El-Sana et al. |
| 2010/0130257 A1 | 5/2010 | Jang |
| 2010/0130280 A1 | 5/2010 | Arezina et al. |
| 2010/0133409 A1 | 6/2010 | Park et al. |
| 2010/0134435 A1 | 6/2010 | Kimura et al. |
| 2010/0141604 A1 | 6/2010 | Cai et al. |
| 2010/0142823 A1 | 6/2010 | Wang et al. |
| 2010/0166276 A1 | 7/2010 | Dube et al. |
| 2010/0176732 A1 | 7/2010 | Schenk et al. |
| 2010/0187422 A1 | 7/2010 | Kothari et al. |
| 2010/0189376 A1 | 7/2010 | Bertram et al. |
| 2010/0193259 A1 | 8/2010 | Wassvik |
| 2010/0195804 A1 | 8/2010 | Dafni et al. |
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0238686 A1 | 9/2010 | Weber et al. |
| 2010/0245292 A1 | 9/2010 | Wu |
| 2010/0253645 A1 | 10/2010 | Bolender |
| 2010/0259939 A1 | 10/2010 | Chen et al. |
| 2010/0265170 A1 | 10/2010 | Norieda |
| 2010/0277431 A1 | 11/2010 | Klinghult |
| 2010/0277436 A1 | 11/2010 | Feng et al. |
| 2010/0277728 A1 | 11/2010 | Imura |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0309139 A1 | 12/2010 | Ng |
| 2010/0315379 A1 | 12/2010 | Allard et al. |
| 2010/0321328 A1 | 12/2010 | Chang et al. |
| 2010/0321341 A1 | 12/2010 | Cho et al. |
| 2010/0322550 A1 | 12/2010 | Trott |
| 2010/0325547 A1 | 12/2010 | Keng et al. |
| 2010/0328265 A1 | 12/2010 | Hotelling et al. |
| 2011/0007021 A1 | 1/2011 | Bernstein et al. |
| 2011/0037735 A1 | 2/2011 | Land et al. |
| 2011/0043490 A1 | 2/2011 | Powell et al. |
| 2011/0049388 A1 | 3/2011 | Delaney et al. |
| 2011/0050576 A1 | 3/2011 | Forutanpour et al. |
| 2011/0050649 A1 | 3/2011 | Newton et al. |
| 2011/0051394 A1 | 3/2011 | Bailey |
| 2011/0057102 A1 | 3/2011 | Yao |
| 2011/0065424 A1 | 3/2011 | Estevez et al. |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0096293 A1 | 4/2011 | Hirose et al. |
| 2011/0102320 A1 | 5/2011 | Hauke et al. |
| 2011/0102374 A1 | 5/2011 | Wassvik et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0140106 A1 | 6/2011 | Forbes |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169756 A1 | 7/2011 | Ogawa et al. |
| 2011/0169780 A1 | 7/2011 | Goertz et al. |
| 2011/0175852 A1 | 7/2011 | Goertz et al. |
| 2011/0181552 A1 | 7/2011 | Goertz et al. |
| 2011/0199297 A1 | 8/2011 | Antonyuk et al. |
| 2011/0205186 A1 | 8/2011 | Newton et al. |
| 2011/0205189 A1 | 8/2011 | Newton |
| 2011/0205750 A1 | 8/2011 | Krijn et al. |
| 2011/0210946 A1 | 9/2011 | Goertz et al. |
| 2011/0216042 A1 | 9/2011 | Wassvik et al. |
| 2011/0220794 A1 | 9/2011 | Censor et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0234537 A1 | 9/2011 | Kim et al. |
| 2011/0254864 A1 | 10/2011 | Tsuchikawa et al. |
| 2011/0255305 A1 | 10/2011 | Chen et al. |
| 2011/0260829 A1 | 10/2011 | Lee |
| 2011/0261020 A1 | 10/2011 | Song et al. |
| 2011/0266423 A1 | 11/2011 | Koeppe et al. |
| 2011/0267264 A1 | 11/2011 | Mccarthy et al. |
| 2011/0267296 A1 | 11/2011 | Noguchi et al. |
| 2011/0287317 A1 | 11/2011 | Nakanishi |
| 2011/0291944 A1 | 12/2011 | Simmons et al. |
| 2011/0291988 A1 | 12/2011 | Bamji et al. |
| 2011/0291989 A1 | 12/2011 | Lee |
| 2011/0298743 A1 | 12/2011 | Machida et al. |
| 2011/0304577 A1 | 12/2011 | Brown et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Chang et al. |
| 2012/0017182 A1 | 1/2012 | Bau |
| 2012/0019448 A1 | 1/2012 | Pitkanen et al. |
| 2012/0026408 A1 | 2/2012 | Lee et al. |
| 2012/0038593 A1 | 2/2012 | Roenkae et al. |
| 2012/0044572 A1 | 2/2012 | Simmonds et al. |
| 2012/0045170 A1 | 2/2012 | Shibata et al. |
| 2012/0050336 A1 | 3/2012 | Nave et al. |
| 2012/0056081 A1 | 3/2012 | Kozodoy |
| 2012/0056807 A1 | 3/2012 | Chapman et al. |
| 2012/0056814 A1 | 3/2012 | Sudo |
| 2012/0062474 A1 | 3/2012 | Weishaupt et al. |

(56) References Cited

U.S. PATENT DOCUMENTS

| | | |
|---|---|---|
| 2012/0062489 A1 | 3/2012 | Andersson et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0091912 A1 | 4/2012 | Brown Elliott |
| 2012/0096383 A1 | 4/2012 | Sakamoto et al. |
| 2012/0098733 A1 | 4/2012 | Masuda et al. |
| 2012/0110447 A1 | 5/2012 | Chen |
| 2012/0131490 A1 | 5/2012 | Lin et al. |
| 2012/0139866 A1 | 6/2012 | Jung et al. |
| 2012/0141001 A1 | 6/2012 | Zhang et al. |
| 2012/0146930 A1 | 6/2012 | Lee |
| 2012/0146950 A1* | 6/2012 | Park .................. G06F 3/0428 345/175 |
| 2012/0146957 A1 | 6/2012 | Dunagan |
| 2012/0153134 A1 | 6/2012 | Bergstroem et al. |
| 2012/0154338 A1 | 6/2012 | Bergstroem et al. |
| 2012/0154339 A1 | 6/2012 | Land et al. |
| 2012/0162142 A1 | 6/2012 | Christiansson et al. |
| 2012/0162144 A1 | 6/2012 | Faahraeus et al. |
| 2012/0169672 A1 | 7/2012 | Christiansson |
| 2012/0170056 A1 | 7/2012 | Jakobsen et al. |
| 2012/0173343 A1 | 7/2012 | Koning |
| 2012/0176328 A1 | 7/2012 | Brown et al. |
| 2012/0176343 A1 | 7/2012 | Holmgren et al. |
| 2012/0181419 A1 | 7/2012 | Momtahan |
| 2012/0182266 A1 | 7/2012 | Han |
| 2012/0188205 A1 | 7/2012 | Jansson et al. |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0206375 A1 | 8/2012 | Fyke et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1 | 8/2012 | Drumm |
| 2012/0221715 A1 | 8/2012 | Hamada |
| 2012/0223916 A1 | 9/2012 | Kukulj |
| 2012/0235892 A1 | 9/2012 | Narendra et al. |
| 2012/0235955 A1 | 9/2012 | Ng et al. |
| 2012/0242622 A1 | 9/2012 | Tseng et al. |
| 2012/0249477 A1 | 10/2012 | Popovich et al. |
| 2012/0249478 A1 | 10/2012 | Chang et al. |
| 2012/0249485 A1 | 10/2012 | Ye et al. |
| 2012/0256882 A1 | 10/2012 | Christiansson et al. |
| 2012/0257004 A1 | 10/2012 | Smith et al. |
| 2012/0262407 A1 | 10/2012 | Hinckley et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0274583 A1 | 11/2012 | Haggerty |
| 2012/0299852 A1 | 11/2012 | Hsu et al. |
| 2012/0305755 A1 | 12/2012 | Hong et al. |
| 2012/0313865 A1 | 12/2012 | Pearce |
| 2013/0002536 A1 | 1/2013 | Yoshida et al. |
| 2013/0007579 A1 | 1/2013 | Dancy et al. |
| 2013/0016059 A1* | 1/2013 | Lowles .................. G06F 3/016 345/174 |
| 2013/0021300 A1 | 1/2013 | Wassvik |
| 2013/0021302 A1 | 1/2013 | Drumm |
| 2013/0027404 A1 | 1/2013 | Sarnoff |
| 2013/0050141 A1 | 2/2013 | Park et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1 | 4/2013 | Tan et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120274 A1 | 5/2013 | Ha et al. |
| 2013/0120320 A1 | 5/2013 | Liu et al. |
| 2013/0120324 A1 | 5/2013 | Diverdi et al. |
| 2013/0125016 A1 | 5/2013 | Pallakoff et al. |
| 2013/0127765 A1* | 5/2013 | Behdasht .............. G06F 3/0412 345/173 |
| 2013/0127790 A1 | 5/2013 | Wassvik |
| 2013/0135258 A1 | 5/2013 | King et al. |
| 2013/0135259 A1 | 5/2013 | King et al. |
| 2013/0136304 A1 | 5/2013 | Anabuki et al. |
| 2013/0141388 A1 | 6/2013 | Ludwig et al. |
| 2013/0141395 A1 | 6/2013 | Holmgren et al. |
| 2013/0141397 A1 | 6/2013 | Dunagan |
| 2013/0155027 A1 | 6/2013 | Holmgren et al. |
| 2013/0155655 A1 | 6/2013 | Lee et al. |
| 2013/0155723 A1 | 6/2013 | Coleman |
| 2013/0158504 A1 | 6/2013 | Ruchti et al. |
| 2013/0162588 A1 | 6/2013 | Wen |
| 2013/0181896 A1 | 7/2013 | Gruhlke et al. |
| 2013/0181908 A1 | 7/2013 | Santiago et al. |
| 2013/0181953 A1 | 7/2013 | Hinckley et al. |
| 2013/0187891 A1* | 7/2013 | Eriksson .............. G06F 1/1616 345/175 |
| 2013/0187957 A1 | 7/2013 | Andersson et al. |
| 2013/0201142 A1 | 8/2013 | Suarez Rovere |
| 2013/0205963 A1 | 8/2013 | Prochello et al. |
| 2013/0208506 A1 | 8/2013 | Ye et al. |
| 2013/0222344 A1 | 8/2013 | Lu et al. |
| 2013/0222346 A1 | 8/2013 | Chen et al. |
| 2013/0229357 A1 | 9/2013 | Powell et al. |
| 2013/0234991 A1 | 9/2013 | Sparf |
| 2013/0241886 A1 | 9/2013 | Eriksson et al. |
| 2013/0241887 A1 | 9/2013 | Sharma |
| 2013/0249833 A1 | 9/2013 | Christiansson et al. |
| 2013/0250354 A1 | 9/2013 | Kato et al. |
| 2013/0254314 A1 | 9/2013 | Chow |
| 2013/0257793 A1 | 10/2013 | Zeliff et al. |
| 2013/0257810 A1 | 10/2013 | Niu et al. |
| 2013/0263042 A1 | 10/2013 | Buening |
| 2013/0263240 A1 | 10/2013 | Moskovitch |
| 2013/0269867 A1 | 10/2013 | Trott |
| 2013/0271487 A1 | 10/2013 | Lincoln |
| 2013/0275082 A1 | 10/2013 | Follmer et al. |
| 2013/0279190 A1 | 10/2013 | Huang |
| 2013/0285920 A1 | 10/2013 | Colley |
| 2013/0285968 A1 | 10/2013 | Christiansson et al. |
| 2013/0285977 A1 | 10/2013 | Baharav et al. |
| 2013/0300714 A1 | 11/2013 | Goh et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0328790 A1 | 12/2013 | Liu et al. |
| 2013/0342490 A1 | 12/2013 | Wallander et al. |
| 2014/0002400 A1 | 1/2014 | Christiansson et al. |
| 2014/0009430 A1 | 1/2014 | Italia et al. |
| 2014/0015803 A1* | 1/2014 | Drumm .................. G06F 3/042 345/175 |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1 | 1/2014 | Kapoor |
| 2014/0035836 A1 | 2/2014 | Cui et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0104190 A1 | 4/2014 | Davidson |
| 2014/0104195 A1 | 4/2014 | Davidson |
| 2014/0109219 A1 | 4/2014 | Rohrweck et al. |
| 2014/0111416 A1 | 4/2014 | Sugiura |
| 2014/0111478 A1 | 4/2014 | Lin et al. |
| 2014/0111480 A1* | 4/2014 | Kim .................. G06F 3/0421 345/175 |
| 2014/0118295 A1 | 5/2014 | Motoi |
| 2014/0139467 A1 | 5/2014 | Ghosh et al. |
| 2014/0149880 A1 | 5/2014 | Farouki |
| 2014/0152624 A1 | 6/2014 | Piot et al. |

(56) References Cited

U.S. PATENT DOCUMENTS

| | | |
|---|---|---|
| 2014/0160762 A1 | 6/2014 | Dudik et al. |
| 2014/0168153 A1* | 6/2014 | Deichmann ............ G06F 3/044 345/174 |
| 2014/0192023 A1 | 7/2014 | Hoffman |
| 2014/0204036 A1 | 7/2014 | Schillings et al. |
| 2014/0210793 A1 | 7/2014 | Eriksson et al. |
| 2014/0218467 A1 | 8/2014 | You et al. |
| 2014/0225868 A1 | 8/2014 | Huang et al. |
| 2014/0226084 A1 | 8/2014 | Utukuri et al. |
| 2014/0226266 A1 | 8/2014 | Kang et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253514 A1 | 9/2014 | Omura et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267147 A1 | 9/2014 | Buelow et al. |
| 2014/0292690 A1 | 10/2014 | Sugihara |
| 2014/0292699 A1* | 10/2014 | Ando ................... G06F 3/0418 345/173 |
| 2014/0292701 A1 | 10/2014 | Christiansson et al. |
| 2014/0300572 A1 | 10/2014 | Ohlsson et al. |
| 2014/0320459 A1 | 10/2014 | Pettersson et al. |
| 2014/0324953 A1 | 10/2014 | Seo et al. |
| 2014/0334767 A1* | 11/2014 | Lim ..................... G06F 3/0421 385/13 |
| 2014/0362046 A1 | 12/2014 | Yoshida |
| 2014/0362053 A1 | 12/2014 | Holmgren et al. |
| 2014/0362404 A1 | 12/2014 | Miyasaka |
| 2014/0367873 A1 | 12/2014 | Yang et al. |
| 2014/0375607 A1 | 12/2014 | Christiansson et al. |
| 2014/0380193 A1 | 12/2014 | Coplen et al. |
| 2015/0002386 A1 | 1/2015 | Mankowski et al. |
| 2015/0002470 A1 | 1/2015 | Zhu et al. |
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0054791 A1 | 2/2015 | Omura |
| 2015/0062021 A1 | 3/2015 | Skaljak et al. |
| 2015/0062085 A1 | 3/2015 | Lu et al. |
| 2015/0070327 A1 | 3/2015 | Hsieh et al. |
| 2015/0083891 A1 | 3/2015 | Wallander |
| 2015/0091832 A1 | 4/2015 | Mizunuma et al. |
| 2015/0092233 A1 | 4/2015 | Park et al. |
| 2015/0103013 A9 | 4/2015 | Huang |
| 2015/0103051 A1 | 4/2015 | Wyrwas et al. |
| 2015/0109403 A1 | 4/2015 | Krishnan et al. |
| 2015/0121691 A1 | 5/2015 | Wang |
| 2015/0131010 A1 | 5/2015 | Sugiyama |
| 2015/0138105 A1 | 5/2015 | Christiansson et al. |
| 2015/0138161 A1 | 5/2015 | Wassvik |
| 2015/0154291 A1 | 6/2015 | Shepherd et al. |
| 2015/0160851 A1 | 6/2015 | Michihata et al. |
| 2015/0169948 A1 | 6/2015 | Motoi |
| 2015/0193141 A1 | 7/2015 | Goldsmith et al. |
| 2015/0193585 A1 | 7/2015 | Sunna |
| 2015/0194668 A1 | 7/2015 | Ueda et al. |
| 2015/0199071 A1 | 7/2015 | Hou |
| 2015/0205439 A1 | 7/2015 | Xu et al. |
| 2015/0205441 A1 | 7/2015 | Bergstrom et al. |
| 2015/0212607 A1 | 7/2015 | Miller et al. |
| 2015/0215450 A1 | 7/2015 | Seo et al. |
| 2015/0227261 A1 | 8/2015 | Huang et al. |
| 2015/0242055 A1 | 8/2015 | Wallander |
| 2015/0253568 A1 | 9/2015 | Kobayashi |
| 2015/0256658 A1 | 9/2015 | Shin et al. |
| 2015/0261323 A1 | 9/2015 | Cui et al. |
| 2015/0261375 A1 | 9/2015 | Leigh et al. |
| 2015/0271481 A1 | 9/2015 | Guthrie et al. |
| 2015/0277636 A1 | 10/2015 | Holmgren et al. |
| 2015/0277663 A1 | 10/2015 | Goertz et al. |
| 2015/0286698 A1 | 10/2015 | Gagnier et al. |
| 2015/0286810 A1 | 10/2015 | Lebert |
| 2015/0288327 A1 | 10/2015 | Cherukupalli et al. |
| 2015/0293600 A1 | 10/2015 | Sears |
| 2015/0302026 A1 | 10/2015 | Nam et al. |
| 2015/0309662 A1 | 10/2015 | Wyrwas et al. |
| 2015/0309765 A1 | 10/2015 | Nagahara |
| 2015/0324028 A1 | 11/2015 | Wassvik et al. |
| 2015/0325848 A1 | 11/2015 | Yamashita et al. |
| 2015/0331461 A1 | 11/2015 | Delano et al. |
| 2015/0331544 A1 | 11/2015 | Bergstrom et al. |
| 2015/0331545 A1 | 11/2015 | Wassvik et al. |
| 2015/0332655 A1 | 11/2015 | Krus et al. |
| 2015/0334138 A1 | 11/2015 | Conklin et al. |
| 2015/0334139 A1 | 11/2015 | Conklin et al. |
| 2015/0339000 A1 | 11/2015 | Lee et al. |
| 2015/0346856 A1 | 12/2015 | Wassvik |
| 2015/0363041 A1 | 12/2015 | Zeliff et al. |
| 2015/0363042 A1 | 12/2015 | Krus et al. |
| 2015/0373864 A1 | 12/2015 | Jung |
| 2015/0378466 A1 | 12/2015 | Emery et al. |
| 2016/0004898 A1 | 1/2016 | Holz |
| 2016/0021833 A1 | 1/2016 | Nishimura et al. |
| 2016/0026297 A1 | 1/2016 | Shinkai et al. |
| 2016/0026337 A1 | 1/2016 | Wassvik et al. |
| 2016/0034109 A1 | 2/2016 | Cho et al. |
| 2016/0041629 A1 | 2/2016 | Rao et al. |
| 2016/0050263 A1 | 2/2016 | Hwang et al. |
| 2016/0050746 A1 | 2/2016 | Wassvik et al. |
| 2016/0056471 A1 | 2/2016 | Sugimori et al. |
| 2016/0062549 A1 | 3/2016 | Drumm et al. |
| 2016/0065633 A1 | 3/2016 | Kawakubo |
| 2016/0070416 A1 | 3/2016 | Wassvik |
| 2016/0077616 A1 | 3/2016 | Durojaiye et al. |
| 2016/0092021 A1 | 3/2016 | Tu et al. |
| 2016/0098148 A1 | 4/2016 | Gandra et al. |
| 2016/0098152 A1 | 4/2016 | Drumm et al. |
| 2016/0103026 A1 | 4/2016 | Povazay et al. |
| 2016/0117019 A1 | 4/2016 | Takeda |
| 2016/0124546 A1 | 5/2016 | Chen et al. |
| 2016/0124551 A1 | 5/2016 | Christiansson et al. |
| 2016/0147375 A1 | 5/2016 | Bok et al. |
| 2016/0154532 A1 | 6/2016 | Campbell |
| 2016/0154533 A1 | 6/2016 | Eriksson et al. |
| 2016/0179261 A1 | 6/2016 | Drumm |
| 2016/0195975 A1 | 7/2016 | Baum et al. |
| 2016/0202801 A1 | 7/2016 | Odagiri et al. |
| 2016/0202841 A1 | 7/2016 | Christiansson et al. |
| 2016/0209886 A1 | 7/2016 | Suh et al. |
| 2016/0210306 A1 | 7/2016 | Kumarasamy et al. |
| 2016/0216844 A1 | 7/2016 | Bergström |
| 2016/0227381 A1 | 8/2016 | Bargetzi et al. |
| 2016/0231833 A1 | 8/2016 | Gu et al. |
| 2016/0239153 A1 | 8/2016 | Holmgren et al. |
| 2016/0246390 A1 | 8/2016 | Lukanc et al. |
| 2016/0253568 A1 | 9/2016 | Idzik et al. |
| 2016/0255713 A1 | 9/2016 | Kim et al. |
| 2016/0269329 A1 | 9/2016 | Willis |
| 2016/0295711 A1 | 10/2016 | Ryu et al. |
| 2016/0299583 A1 | 10/2016 | Watanabe |
| 2016/0306501 A1 | 10/2016 | Drumm et al. |
| 2016/0328090 A1 | 11/2016 | Klinghult |
| 2016/0342282 A1 | 11/2016 | Wassvik |
| 2017/0031516 A1 | 2/2017 | Sugiyama et al. |
| 2017/0060346 A1 | 3/2017 | Park et al. |
| 2017/0075476 A1 | 3/2017 | Kwon et al. |
| 2017/0075484 A1 | 3/2017 | Kali et al. |
| 2017/0075494 A1 | 3/2017 | Kwon et al. |
| 2017/0083164 A1 | 3/2017 | Sheng et al. |
| 2017/0090598 A1* | 3/2017 | Morrison ................ G06F 3/046 |
| 2017/0094224 A1 | 3/2017 | Hasegawa et al. |
| 2017/0115823 A1 | 4/2017 | Huang et al. |
| 2017/0123257 A1 | 5/2017 | Zhao |
| 2017/0131846 A1 | 5/2017 | Huitema |
| 2017/0147105 A1 | 5/2017 | Kwon et al. |
| 2017/0153763 A1 | 6/2017 | Vavra et al. |
| 2017/0160871 A1 | 6/2017 | Drumm |

(56) References Cited

U.S. PATENT DOCUMENTS

| | | |
|---|---|---|
| 2017/0185186 A1* | 6/2017 | Liu .................. G06F 3/0447 |
| 2017/0185230 A1 | 6/2017 | Wallander et al. |
| 2017/0185269 A1 | 6/2017 | Anttila et al. |
| 2017/0192493 A1 | 7/2017 | Ofek et al. |
| 2017/0192596 A1* | 7/2017 | Lee .................. G02F 1/1339 |
| 2017/0205995 A1 | 7/2017 | Johansson |
| 2017/0220204 A1 | 8/2017 | Huang et al. |
| 2017/0235537 A1 | 8/2017 | Liu et al. |
| 2017/0237871 A1 | 8/2017 | Fan |
| 2017/0242579 A1 | 8/2017 | Poon et al. |
| 2017/0249030 A1* | 8/2017 | Park .................. G06F 3/0448 |
| 2017/0255337 A1* | 9/2017 | Drumm .............. G06F 3/0428 |
| 2017/0264865 A1 | 9/2017 | Huangfu |
| 2017/0277355 A1 | 9/2017 | Kang |
| 2017/0285789 A1 | 10/2017 | Barel |
| 2017/0308236 A1 | 10/2017 | Lee |
| 2017/0318115 A1 | 11/2017 | Peng et al. |
| 2017/0336891 A1* | 11/2017 | Rosenberg .......... G06F 3/04144 |
| 2018/0049014 A1 | 2/2018 | Patil et al. |
| 2018/0062158 A1 | 3/2018 | Kim et al. |
| 2018/0074654 A1 | 3/2018 | Tanaka et al. |
| 2018/0106692 A1 | 4/2018 | Ciocarlie et al. |
| 2018/0107373 A1 | 4/2018 | Cheng |
| 2018/0113569 A1 | 4/2018 | Pommier et al. |
| 2018/0129311 A1 | 5/2018 | Westhues et al. |
| 2018/0136787 A1 | 5/2018 | Echols et al. |
| 2018/0136788 A1 | 5/2018 | He et al. |
| 2018/0149792 A1 | 5/2018 | Lee et al. |
| 2018/0168153 A1 | 6/2018 | Chen et al. |
| 2018/0203557 A1* | 7/2018 | Kim .................. H10K 59/40 |
| 2018/0204877 A1 | 7/2018 | Jalili et al. |
| 2018/0205989 A1 | 7/2018 | Srinivasan et al. |
| 2018/0225006 A1 | 8/2018 | Wall |
| 2018/0235017 A1 | 8/2018 | Sakamoto |
| 2018/0253187 A1 | 9/2018 | Christiansson et al. |
| 2018/0263126 A1 | 9/2018 | Curran et al. |
| 2018/0267672 A1* | 9/2018 | Wassvik ............. G06F 3/0428 |
| 2018/0275830 A1 | 9/2018 | Christiansson et al. |
| 2018/0275836 A1 | 9/2018 | Hermans et al. |
| 2018/0279454 A1 | 9/2018 | Takeshita et al. |
| 2018/0293436 A1 | 10/2018 | Jeon et al. |
| 2018/0314206 A1 | 11/2018 | Lee et al. |
| 2018/0349014 A1 | 12/2018 | Samuel et al. |
| 2019/0004668 A1 | 1/2019 | Jeong et al. |
| 2019/0012027 A1 | 1/2019 | Park et al. |
| 2019/0025977 A1 | 1/2019 | Christiansson et al. |
| 2019/0025984 A1 | 1/2019 | Weilbacher et al. |
| 2019/0050074 A1 | 2/2019 | Kocovski |
| 2019/0065030 A1 | 2/2019 | Kang et al. |
| 2019/0079638 A1 | 3/2019 | Kocovski et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196660 A1 | 6/2019 | Skagmo et al. |
| 2019/0227670 A1 | 7/2019 | O'Cleirigh et al. |
| 2019/0235665 A1 | 8/2019 | Kim et al. |
| 2019/0235701 A1* | 8/2019 | Han .................. G02B 6/32 |
| 2019/0250755 A1 | 8/2019 | Liu et al. |
| 2019/0250769 A1 | 8/2019 | Wallander |
| 2019/0258353 A1 | 8/2019 | Drumm et al. |
| 2019/0265941 A1 | 8/2019 | Baba |
| 2019/0272052 A1 | 9/2019 | Wallander et al. |
| 2019/0317640 A1* | 10/2019 | Christiansson ....... G06F 3/0421 |
| 2019/0324570 A1 | 10/2019 | Kolundzija et al. |
| 2019/0377431 A1 | 12/2019 | Drumm |
| 2019/0377435 A1 | 12/2019 | Piot et al. |
| 2020/0001645 A1 | 1/2020 | Yano et al. |
| 2020/0006761 A1 | 1/2020 | Fujino et al. |
| 2020/0012359 A1 | 1/2020 | Jakobson et al. |
| 2020/0012408 A1 | 1/2020 | Drumm et al. |
| 2020/0064937 A1 | 2/2020 | Wassvik et al. |
| 2020/0073509 A1 | 3/2020 | Shih et al. |
| 2020/0096854 A1 | 3/2020 | Schiavoni et al. |
| 2020/0098147 A1 | 3/2020 | Ha et al. |
| 2020/0125189 A1 | 4/2020 | Kim et al. |
| 2020/0159382 A1 | 5/2020 | Drumm |
| 2020/0167033 A1 | 5/2020 | Kim et al. |
| 2020/0173050 A1 | 6/2020 | Curran et al. |
| 2020/0174644 A1 | 6/2020 | Weibull et al. |
| 2020/0177742 A1 | 6/2020 | Homma et al. |
| 2020/0249777 A1 | 8/2020 | Hou et al. |
| 2020/0293136 A1 | 9/2020 | Jakobson et al. |
| 2020/0310621 A1 | 10/2020 | Piot et al. |
| 2020/0337173 A1 | 10/2020 | Wang et al. |
| 2020/0341587 A1 | 10/2020 | Drumm |
| 2020/0348473 A1 | 11/2020 | Drumm |
| 2020/0348817 A1 | 11/2020 | Ohlsson et al. |
| 2020/0387237 A1 | 12/2020 | Drumm |
| 2021/0026587 A1 | 1/2021 | Christiansson et al. |
| 2021/0041970 A1 | 2/2021 | Bergström et al. |
| 2021/0050086 A1 | 2/2021 | Rose et al. |
| 2021/0081071 A1 | 3/2021 | Koh et al. |
| 2021/0089164 A1 | 3/2021 | Christiansson et al. |
| 2021/0096604 A1 | 4/2021 | Curran et al. |
| 2021/0352120 A1 | 11/2021 | Masi et al. |
| 2022/0035481 A1 | 2/2022 | Bergström et al. |
| 2022/0100313 A1 | 3/2022 | Holmgren |
| 2022/0221955 A1 | 7/2022 | Bergström et al. |
| 2023/0057020 A1 | 2/2023 | Wassvik |
| 2023/0082401 A1 | 3/2023 | Andreasson et al. |
| 2023/0168775 A1 | 6/2023 | Skagmo et al. |
| 2023/0229266 A1 | 7/2023 | Bergstrom et al. |
| 2023/0393692 A1 | 12/2023 | Krus |
| 2023/0400948 A1 | 12/2023 | Bergström et al. |
| 2024/0111367 A1 | 4/2024 | Wassvik et al. |
| 2024/0248565 A1 | 7/2024 | Bergstrom et al. |
| 2024/0280847 A1 | 8/2024 | Kocovski et al. |
| 2025/0060930 A1 | 2/2025 | Berglund et al. |

FOREIGN PATENT DOCUMENTS

| | | |
|---|---|---|
| CA | 2745422 A1 | 6/2010 |
| CA | 2762681 A1 | 7/2012 |
| CN | 1794157 A | 6/2006 |
| CN | 101019071 A | 8/2007 |
| CN | 101075168 A | 11/2007 |
| CN | 101174191 A | 5/2008 |
| CN | 101206550 A | 6/2008 |
| CN | 201233592 Y | 5/2009 |
| CN | 101644854 A | 2/2010 |
| CN | 201437963 U | 4/2010 |
| CN | 201465071 U | 5/2010 |
| CN | 101882034 A | 11/2010 |
| CN | 102117155 A | 7/2011 |
| CN | 102929449 A | 2/2013 |
| CN | 202887145 U | 4/2013 |
| CN | 103123556 A | 5/2013 |
| CN | 203189466 U | 9/2013 |
| CN | 203224848 U | 10/2013 |
| CN | 203453994 U | 2/2014 |
| CN | 102414646 B | 4/2014 |
| CN | 203720812 U | 7/2014 |
| CN | 203786707 U | 8/2014 |
| CN | 203786708 U | 8/2014 |
| CN | 203825586 U | 9/2014 |
| CN | 104391611 A | 3/2015 |
| CN | 204288179 U | 4/2015 |
| CN | 104808843 A | 7/2015 |
| CN | 204695282 U | 10/2015 |
| CN | 105183241 A | 12/2015 |
| CN | 205015574 U | 2/2016 |
| CN | 205384833 U | 7/2016 |
| CN | 106648222 A | 5/2017 |
| CN | 206400503 U | 8/2017 |
| CN | 108345414 A | 7/2018 |
| CN | 105320382 B | 4/2021 |
| CN | 113010053 A | 6/2021 |
| DE | 3511330 A1 | 10/1986 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 10025175 A1 | 12/2001 |
| DE | 102009003990 A1 | 7/2010 |

(56) References Cited

FOREIGN PATENT DOCUMENTS

| | | |
|---|---|---|
| DE | 102010000473 A1 | 8/2010 |
| EP | 0600576 A1 | 6/1994 |
| EP | 0845812 A2 | 6/1998 |
| EP | 0897161 A1 | 2/1999 |
| EP | 0931731 A1 | 7/1999 |
| EP | 1126236 A1 | 8/2001 |
| EP | 1457870 A2 | 9/2004 |
| EP | 1471459 A2 | 10/2004 |
| EP | 1512989 A2 | 3/2005 |
| EP | 1798630 A2 | 6/2007 |
| EP | 1835464 A1 | 9/2007 |
| EP | 2077490 A2 | 7/2009 |
| EP | 2088501 A1 | 8/2009 |
| EP | 2314203 A1 | 4/2011 |
| EP | 2325735 A2 | 5/2011 |
| EP | 2339437 A2 | 6/2011 |
| EP | 0985206 B1 | 3/2012 |
| EP | 2442180 A1 | 4/2012 |
| EP | 2466428 A2 | 6/2012 |
| EP | 2466429 A1 | 6/2012 |
| EP | 2479642 A1 | 7/2012 |
| EP | 2515216 A1 | 10/2012 |
| EP | 2565770 A2 | 3/2013 |
| EP | 2765622 A2 | 8/2014 |
| EP | 2778849 A1 | 9/2014 |
| EP | 2797143 A1 | 10/2014 |
| EP | 2840470 A2 | 2/2015 |
| EP | 3002666 A1 | 4/2016 |
| EP | 3043242 A1 | 7/2016 |
| EP | 3535640 A1 | 9/2019 |
| EP | 3537269 A1 | 9/2019 |
| EP | 3644167 A1 | 4/2020 |
| FR | 2172828 A1 | 10/1973 |
| FR | 2617619 A1 | 1/1989 |
| FR | 2617620 A1 | 1/1989 |
| FR | 2614711 B1 | 3/1992 |
| FR | 2676275 A1 | 11/1992 |
| GB | 1380144 A | 1/1975 |
| GB | 2131544 A | 6/1984 |
| GB | 2204126 A | 11/1988 |
| GB | 2263765 A | 8/1993 |
| GB | 2472444 A | 2/2011 |
| JP | 62-159213 A | 7/1987 |
| JP | 05-190066 A | 7/1993 |
| JP | 11-085399 A | 3/1999 |
| JP | 2000-506655 A | 5/2000 |
| JP | 2000-172438 A | 6/2000 |
| JP | 2000-259334 A | 9/2000 |
| JP | 2000-268824 A | 9/2000 |
| JP | 2000-293311 A | 10/2000 |
| JP | 2003-330603 A | 11/2003 |
| JP | 2005-004278 A | 1/2005 |
| JP | 2008-506173 A | 2/2008 |
| JP | 2009-004139 A | 1/2009 |
| JP | 2009-543173 A | 12/2009 |
| JP | 2010-238426 A | 10/2010 |
| JP | 2011-530124 A | 12/2011 |
| JP | 2015-038862 A | 2/2015 |
| JP | 2015-049965 A | 3/2015 |
| JP | 2015-158831 A | 9/2015 |
| JP | 2016-192688 A | 11/2016 |
| JP | 6211595 B2 | 10/2017 |
| KR | 10-2001-0060254 A | 7/2001 |
| KR | 10-0359400 B1 | 10/2002 |
| KR | 10-0940435 B1 | 2/2010 |
| KR | 10-1081586 B1 | 11/2011 |
| KR | 10-1319543 B1 | 10/2013 |
| KR | 10-2015-0125374 A | 11/2015 |
| KR | 10-2016-0075643 A | 6/2016 |
| KR | 10-1933889 B1 | 12/2018 |
| NL | 2019782 B1 | 4/2019 |
| TW | M517370 U | 2/2016 |
| WO | 84/03186 A1 | 8/1984 |
| WO | 95/27919 A2 | 10/1995 |
| WO | 96/10148 A1 | 4/1996 |
| WO | 96/23649 A1 | 8/1996 |
| WO | 98/07127 A1 | 2/1998 |
| WO | 99/46602 A1 | 9/1999 |
| WO | 00/50807 A1 | 8/2000 |
| WO | 01/20781 A1 | 3/2001 |
| WO | 01/27867 A1 | 4/2001 |
| WO | 01/71654 A1 | 9/2001 |
| WO | 01/84251 A2 | 11/2001 |
| WO | 02/07072 A2 | 1/2002 |
| WO | 02/35460 A1 | 5/2002 |
| WO | 02/77915 A2 | 10/2002 |
| WO | 02/95668 A1 | 11/2002 |
| WO | 03/41006 A1 | 5/2003 |
| WO | 03/76870 A1 | 9/2003 |
| WO | 2004/032210 A2 | 4/2004 |
| WO | 2004/081502 A2 | 9/2004 |
| WO | 2004/081956 A2 | 9/2004 |
| WO | 2005/026938 A2 | 3/2005 |
| WO | 2005/029172 A2 | 3/2005 |
| WO | 2005/029395 A2 | 3/2005 |
| WO | 2005/125011 A2 | 12/2005 |
| WO | 2006/003245 A1 | 1/2006 |
| WO | 2006/081633 A1 | 8/2006 |
| WO | 2006/095320 A2 | 9/2006 |
| WO | 2006/124551 A2 | 11/2006 |
| WO | 2007/003196 A2 | 1/2007 |
| WO | 2007/047685 A2 | 4/2007 |
| WO | 2007/058924 A2 | 5/2007 |
| WO | 2007/112742 A1 | 10/2007 |
| WO | 2008/004097 A2 | 1/2008 |
| WO | 2008/004103 A2 | 1/2008 |
| WO | 2008/007276 A2 | 1/2008 |
| WO | 2008/007372 A2 | 1/2008 |
| WO | 2008/017077 A2 | 2/2008 |
| WO | 2008/032270 A2 | 3/2008 |
| WO | 2008/034184 A1 | 3/2008 |
| WO | 2008/038066 A2 | 4/2008 |
| WO | 2008/039006 A1 | 4/2008 |
| WO | 2008/044024 A2 | 4/2008 |
| WO | 2008/068607 A2 | 6/2008 |
| WO | 2009/000289 A1 | 12/2008 |
| WO | 2009/007704 A1 | 1/2009 |
| WO | 2009/029764 A1 | 3/2009 |
| WO | 2009/048365 A1 | 4/2009 |
| WO | 2009/077962 A2 | 6/2009 |
| WO | 2009/102681 A2 | 8/2009 |
| WO | 2009/135320 A1 | 11/2009 |
| WO | 2009/137355 A2 | 11/2009 |
| WO | 2010/006882 A2 | 1/2010 |
| WO | 2010/006883 A2 | 1/2010 |
| WO | 2010/006884 A2 | 1/2010 |
| WO | 2010/006885 A2 | 1/2010 |
| WO | 2010/006886 A2 | 1/2010 |
| WO | 2010/015408 A1 | 2/2010 |
| WO | 2010/015410 A2 | 2/2010 |
| WO | 2010/046539 A1 | 4/2010 |
| WO | 2010/056177 A1 | 5/2010 |
| WO | 2010/064983 A2 | 6/2010 |
| WO | 2010/081702 A2 | 7/2010 |
| WO | 2010/112404 A1 | 10/2010 |
| WO | 2010/123809 A2 | 10/2010 |
| WO | 2010/134865 A1 | 11/2010 |
| WO | 2011/028169 A1 | 3/2011 |
| WO | 2011/028170 A1 | 3/2011 |
| WO | 2011/031215 A1 | 3/2011 |
| WO | 2011/049511 A1 | 4/2011 |
| WO | 2011/049512 A1 | 4/2011 |
| WO | 2011/049513 A1 | 4/2011 |
| WO | 2011/057572 A1 | 5/2011 |
| WO | 2011/078769 A1 | 6/2011 |
| WO | 2011/082477 A1 | 7/2011 |
| WO | 2011/104673 A1 | 9/2011 |
| WO | 2011/119483 A1 | 9/2011 |
| WO | 2011/139213 A1 | 11/2011 |
| WO | 2012/002894 A1 | 1/2012 |
| WO | 2012/005051 A1 | 1/2012 |
| WO | 2012/010078 A1 | 1/2012 |
| WO | 2012/012165 A1 | 1/2012 |
| WO | 2012/015810 A2 | 2/2012 |

(56) References Cited

FOREIGN PATENT DOCUMENTS

| | | |
|---|---|---|
| WO | 2012/018176 A2 | 2/2012 |
| WO | 2012/050510 A1 | 4/2012 |
| WO | 2012/082055 A1 | 6/2012 |
| WO | 2012/105893 A1 | 8/2012 |
| WO | 2012/121652 A1 | 9/2012 |
| WO | 2012/158105 A2 | 11/2012 |
| WO | 2012/171181 A1 | 12/2012 |
| WO | 2012/172302 A1 | 12/2012 |
| WO | 2012/176801 A1 | 12/2012 |
| WO | 2013/011571 A1 | 1/2013 |
| WO | 2013/014534 A2 | 1/2013 |
| WO | 2013/036192 A1 | 3/2013 |
| WO | 2013/048312 A2 | 4/2013 |
| WO | 2013/055282 A2 | 4/2013 |
| WO | 2013/062471 A2 | 5/2013 |
| WO | 2013/081818 A1 | 6/2013 |
| WO | 2013/089622 A2 | 6/2013 |
| WO | 2013/108031 A2 | 7/2013 |
| WO | 2013/126005 A2 | 8/2013 |
| WO | 2013/133756 A1 | 9/2013 |
| WO | 2013/133757 A2 | 9/2013 |
| WO | 2013/138003 A1 | 9/2013 |
| WO | 2013/095271 A3 | 10/2013 |
| WO | 2013/115710 A3 | 10/2013 |
| WO | 2013/159472 A1 | 10/2013 |
| WO | 2013/165305 A2 | 11/2013 |
| WO | 2013/165306 A2 | 11/2013 |
| WO | 2013/176613 A2 | 11/2013 |
| WO | 2013/176614 A2 | 11/2013 |
| WO | 2013/176615 A2 | 11/2013 |
| WO | 2013/191638 A1 | 12/2013 |
| WO | 2014/016685 A1 | 1/2014 |
| WO | 2014/017973 A1 | 1/2014 |
| WO | 2014/027241 A2 | 2/2014 |
| WO | 2014/037963 A1 | 3/2014 |
| WO | 2014/044181 A1 | 3/2014 |
| WO | 2014/055809 A1 | 4/2014 |
| WO | 2014/042576 A3 | 5/2014 |
| WO | 2014/065601 A1 | 5/2014 |
| WO | 2014/085726 A2 | 6/2014 |
| WO | 2014/086084 A1 | 6/2014 |
| WO | 2014/093937 A1 | 6/2014 |
| WO | 2014/098740 A1 | 6/2014 |
| WO | 2014/098741 A1 | 6/2014 |
| WO | 2014/098742 A1 | 6/2014 |
| WO | 2014/098743 A1 | 6/2014 |
| WO | 2014/098744 A1 | 6/2014 |
| WO | 2014/104967 A1 | 7/2014 |
| WO | 2014/130515 A1 | 8/2014 |
| WO | 2014/131221 A1 | 9/2014 |
| WO | 2014/168567 A1 | 10/2014 |
| WO | 2014/168568 A1 | 10/2014 |
| WO | 2014/168569 A1 | 10/2014 |
| WO | 2015/005847 A1 | 1/2015 |
| WO | 2015/029350 A1 | 3/2015 |
| WO | 2015/076731 A1 | 5/2015 |
| WO | 2015/084644 A1 | 6/2015 |
| WO | 2015/108477 A1 | 7/2015 |
| WO | 2015/108479 A1 | 7/2015 |
| WO | 2015/108480 A1 | 7/2015 |
| WO | 2015/123322 A1 | 8/2015 |
| WO | 2015/108478 A3 | 11/2015 |
| WO | 2015/175586 A1 | 11/2015 |
| WO | 2015/199602 A1 | 12/2015 |
| WO | 2016/122385 A1 | 8/2016 |
| WO | 2016/130074 A1 | 8/2016 |
| WO | 2016/140612 A1 | 9/2016 |
| WO | 2016/160745 A1 | 10/2016 |
| WO | 2016/177592 A1 | 11/2016 |
| WO | 2017/026821 A1 | 2/2017 |
| WO | 2017/099657 A1 | 6/2017 |
| WO | 2017/138863 A1 | 8/2017 |
| WO | 2018/003929 A1 | 1/2018 |
| WO | 2018/090060 A1 | 5/2018 |
| WO | 2018/096430 A1 | 5/2018 |
| WO | 2018/106172 A1 | 6/2018 |
| WO | 2018/106176 A1 | 6/2018 |
| WO | 2018/141948 A1 | 8/2018 |
| WO | 2018/147782 A1 | 8/2018 |
| WO | 2018/182476 A1 | 10/2018 |
| WO | 2019/032014 A1 | 2/2019 |
| WO | 2019/039984 A1 | 2/2019 |
| WO | 2019/045629 A1 | 3/2019 |
| WO | 2019/050459 A1 | 3/2019 |
| WO | 2019/156609 A1 | 8/2019 |
| WO | 2019/172826 A1 | 9/2019 |
| WO | 2019/172827 A1 | 9/2019 |
| WO | 2019/172829 A1 | 9/2019 |
| WO | 2019/177515 A1 | 9/2019 |
| WO | 2019/187537 A1 | 10/2019 |
| WO | 2020/022096 A1 | 1/2020 |
| WO | 2020/078339 A1 | 4/2020 |
| WO | 2020/078749 A1 | 4/2020 |
| WO | 2020/080992 A1 | 4/2020 |
| WO | 2020/153890 A1 | 7/2020 |
| WO | 2020/168802 A1 | 8/2020 |
| WO | 2020/236072 A1 | 11/2020 |
| WO | 2021/107840 A1 | 6/2021 |
| WO | 2021/112754 A1 | 6/2021 |
| WO | 2021/158164 A1 | 8/2021 |
| WO | 2021/158167 A1 | 8/2021 |
| WO | 2021/162602 A1 | 8/2021 |
| WO | 2022/086396 A1 | 4/2022 |
| WO | 2022/108508 A1 | 5/2022 |
| WO | 2022/173353 A1 | 8/2022 |

OTHER PUBLICATIONS

Swedish Search Report in Application No. 1350181.2 dated Dec. 11, 2013.

Swedish Search Report in Application No. 1450651.3 dated Dec. 22, 2014.

Tedaldi, M., et al. "Refractive index mapping of layered samples using optical coherence refractometry," Proceedings of SPIE, vol. 7171, 2009, in 8 pages.

The Laser Wall, MIT, 1997, http://web.media.mit.edu/"joep/SpectrumWeb/captions/Laser.html.

Tholfsen, M, "The NEW Microsoft Teams Whiteboard 2021 // A fully updated & improved Whiteboard in Teams meetings," 2021, Retrieved from the Internet: URL: https://www.voutube.com/watch?v=vDO- EUZUmiA, retrieved on Mar. 14, 2023, see video from 0:10-0:39.

Thomas, G.L et al., "Some observations on fingerprint deposits." J. Phys. D: Appl. Phys. 8 (1975): 724-729.

Tympanus/Codrops | Animated Mesh Lines, posted on Jan. 8, 2019 by Jeremie Boulay, © Codrops 2020 [online], [site visited Oct. 13, 2020], Available from Internet, <URL: https://tympanus.net/codrops/2019/01/08/animated-mesh-lines/>.

International Preliminary Report on Patentability received for PCT Patent Application No. PCT/SE2019/050193, mailed on Sep. 17, 2020, 8 pages.

International Preliminary Report on Patentability received for PCT Patent Application No. PCT/SE2019/050195, mailed on Oct. 1, 2020, 10 pages.

International Preliminary Report on Patentability received for PCT Patent Application No. PCT/SE2019/050953, mailed on Apr. 29, 2021, 11 pages.

International Preliminary Report on Patentability received for PCT Patent Application No. PCT/SE2020/050504, mailed on Dec. 2, 2021, 10 pages.

International Preliminary Report on Patentability received for PCT Patent Application No. PCT/SE2020/051117, mailed on Jun. 9, 2022, 10 pages.

International Preliminary Report on Patentability received for PCT Patent Application No. PCT/SE2020/051172, mailed on Jun. 16, 2022, 8 pages.

International Preliminary Report on Patentability received for PCT Patent Application No. PCT/SE2021/050040, mailed on Aug. 25, 2022, 13 pages.

(56) References Cited

OTHER PUBLICATIONS

International Preliminary Report on Patentability received for PCT Patent Application No. PCT/SE2021/050095, mailed on Aug. 18, 2022, 11 pages.
International Preliminary Report on Patentability received for PCT Patent Application No. PCT/SE2021/051018, mailed on May 4, 2023, 8 pages.
International Preliminary Report on Patentability received for PCT Patent Application No. PCT/SE2021/051151, mailed on Jun. 1, 2023, 10 pages.
International Preliminary Report on Patentability received for PCT Patent Application No. PCT/SE22/050139, mailed on Aug. 24, 2023, 9 pages.
International Preliminary Report on Patentability received in International Application No. PCT/SE2017/051233, dated Jun. 11, 2019, in 6 pages.
International Search and Report mailed on Sep. 23, 2022 in International Application PCT/SE2022/050575.
International Search Report and Written Opinion for International App. No. PCT/SE2019/050343, dated Sep. 3, 2019, in 13 pages.
International Search Report and Written Opinion in International Application No. PCT/SE2023/050352 dated Jul. 10, 2023.
International Search Report and Written Opinion issued in International Application No. PCT/SE2010/051103 dated Jan. 25, 2011.
International Search Report and Written Opinion issued in International Application No. PCT/SE2010/051105 dated Nov. 16, 2010.
International Search Report and Written Opinion issued in International Application No. PCT/SE2010/051107 dated Jan. 24, 2011.
International Search Report and Written Opinion of the International Searching Authority for PCT/SE2021/051018, dated Feb. 1, 2022, in 10 pages.
International Search Report and Written Opinion received for PCT Patent Application No. PCT/EP2018/052757, mailed on Apr. 23, 2018, 9 pages.
International Search Report and Written Opinion received for PCT Patent Application No. PCT/EP2019/077054, mailed on Jan. 10, 2020, 9 pages.
International Search Report and Written Opinion received for PCT Patent Application No. PCT/JP2019/001801, mailed on Apr. 23, 2019, 13 pages (6 pages of English Translation and 7 pages of Original Document).
International Search Report and Written Opinion received for PCT Patent Application No. PCT/SE2009/051364, mailed on May 4, 2010, 15 pages.
International Search Report and Written Opinion received for PCT Patent Application No. PCT/SE2011/050520, mailed on Aug. 18, 2011, 8 pages.
International Search Report and Written Opinion received for PCT Patent Application No. PCT/SE2012/050086, mailed on May 23, 2012, 9 pages.
International Search Report and Written Opinion received for PCT Patent Application No. PCT/SE2012/051419, mailed on Aug. 26, 2013, 8 pages.
International Search Report and Written Opinion received for PCT Patent Application No. PCT/SE2013/050064, mailed on Sep. 12, 2013, 10 pages.
International Search Report and Written Opinion received for PCT Patent Application No. PCT/SE2013/050137, mailed on Oct. 15, 2013, 9 pages.
International Search Report and Written Opinion received for PCT Patent Application No. PCT/SE2013/050473, mailed on Feb. 3, 2014, 11 pages.
International Search Report and Written Opinion received for PCT Patent Application No. PCT/SE2013/050585, mailed on Jan. 21, 2014, 13 pages.
International Search Report and Written Opinion received for PCT Patent Application No. PCT/SE2013/051044, mailed on Mar. 20, 2014, 9 pages.
International Search Report and Written Opinion received for PCT Patent Application No. PCT/SE2013/051533, mailed on Apr. 15, 2014, 10 pages.
International Search Report and Written Opinion received for PCT Patent Application No. PCT/SE2013/051534, mailed on May 6, 2014, 11 pages.
International Search Report and Written Opinion received for PCT Patent Application No. PCT/SE2013/051537, mailed on Apr. 25, 2014, 12 pages.
International Search Report and Written Opinion received for PCT Patent Application No. PCT/SE2014/050435, mailed on Jun. 12, 2014, 11 pages.
International Search Report and Written Opinion received for PCT Patent Application No. PCT/SE2014/050437, mailed on Jul. 1, 2014, 9 pages.
International Search Report and Written Opinion received for PCT Patent Application No. PCT/SE2014/050438, mailed on Jul. 1, 2014, 9 pages.
International Search Report and Written Opinion received for PCT Patent Application No. PCT/SE2014/050701, mailed on Nov. 6, 2014, 11 pages.
International Search Report and Written Opinion received for PCT Patent Application No. PCT/SE2014/051363, mailed on Feb. 12, 2015, 9 pages.
International Search Report and Written Opinion received for PCT Patent Application No. PCT/SE2015/050041, mailed on Apr. 29, 2015, 12 pages.
International Search Report and Written Opinion received for PCT Patent Application No. PCT/SE2015/050042, mailed on Sep. 28, 2015, 14 pages.
International Search Report and Written Opinion received for PCT Patent Application No. PCT/SE2015/050043, mailed on May 19, 2015, 12 pages.
International Search Report and Written Opinion received for PCT Patent Application No. PCT/SE2015/050044, mailed on May 19, 2015, 11 pages.
International Search Report and Written Opinion received for PCT Patent Application No. PCT/SE2015/050724, mailed on Oct. 6, 2015, 10 pages.
International Search Report and Written Opinion received for PCT Patent Application No. PCT/SE2016/050053, mailed on May 2, 2016, 16 pages.
International Search Report and Written Opinion received for PCT Patent Application No. PCT/SE2016/050098, mailed on Jun. 29, 2016, 13 pages.
International Search Report and Written Opinion received for PCT Patent Application No. PCT/SE2016/050155, mailed on Jul. 15, 2016, 10 pages.
International Search Report and Written Opinion received for PCT Patent Application No. PCT/SE2016/051229, mailed on Mar. 10, 2017, 18 pages.
International Search Report and Written Opinion received for PCT Patent Application No. PCT/SE2017/051233, mailed on Mar. 12, 2018, 10 pages.
International Search Report and Written Opinion received for PCT Patent Application No. PCT/SE2018/050109, mailed on May 3, 2018, 15 pages.
International Search Report and Written Opinion received for PCT Patent Application No. PCT/SE2018/050817, mailed on Jan. 28, 2019, 12 pages.
International Search Report and Written Opinion received for PCT Patent Application No. PCT/SE2018/050896, mailed on Nov. 27, 2018, 13 pages.
International Search Report and Written Opinion received for PCT Patent Application No. PCT/SE2019/050190, mailed on Jun. 12, 2019, 11 pages.
International Search Report and Written Opinion received for PCT Patent Application No. PCT/SE2019/050193, mailed on Apr. 10, 2019, 11 pages.
International Search Report and Written Opinion received for PCT Patent Application No. PCT/SE2019/050195, mailed on Jun. 12, 2019, 13 pages.

(56) References Cited

OTHER PUBLICATIONS

International Search Report and Written Opinion received for PCT Patent Application No. PCT/SE2020/050504, mailed on Sep. 4, 2020, 13 pages.
International Search Report and Written Opinion received for PCT Patent Application No. PCT/SE2022/050139, mailed on Apr. 8, 2022, 12 pages.
International Search Report and Written Opinion received for PCT Patent Application No. PCT/SE2011/050871, mailed on Nov. 28, 2011, 13 pages.
International Search Report and Written Opinion received in International Application No. PCT/SE2021/051151 dated Jan. 26, 2022, in 13 pages.
International Search Report and Written Opinion received in International Application No. PCT/SE2023/050456, mailed Jul. 17, 2023.
International Search Report and Written Opinion received in International Application No. PCT/SE2023/051245 dated Feb. 13, 2024.
International Search Report for International App. No. PCT/IB2017/057201, dated Mar. 6, 2018, in 4 pages.
International Search Report for International App. No. PCT/SE2017/050102, dated Apr. 5, 2017, in 4 pages.
International Search Report for International App. No. PCT/SE2017/051224, dated Feb. 23, 2018, in 5 pages.
International Search Report for International App. No. PCT/SE2018/050070, dated Apr. 25, 2018, in 4 pages.
International Search Report for International App. No. PCT/SE2019/050953, dated Nov. 26, 2019, in 4 pages.
International Search Report in App. No. PCT/SE2020/051117 dated Feb. 5, 2021 in 2 pages.
International Search Report in International Application No. PCT/SE2020/051172 dated Feb. 4, 2021 in 5 pages.
International Search Report in International Application No. PCT/SE2021/050040 dated May 10, 2021 in 3 pages.
International Search Report in International Application No. PCT/SE2021/050095 dated Jun. 2, 2021 in 7 pages.
International Search Report in PCT/SE2019/050189 dated May 29, 2019 in 5 pages.
International Search Report received for PCT Patent Application No. PCT/SE2015/050087, mailed on May 6, 2015, 4 pages.
Johnson, M., "Enhanced Optical Touch Input Panel", IBM Technical Disclosure Bulletin, 1985, in 3 pages.
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 127 pages, (uploaded in 4 parts, part 1 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 128 pages, (uploaded in 4 parts, part 4 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 65 pages, (uploaded in 4 parts, part 3 of 4).
Joint Claim Construction Brief, *Flatfrog Laboratories AB v. Promethean Ltd. and Promethean Inc.*, C.A. No. 1:19-cv-02246-MN, dated Sep. 20, 2021, in 92 pages.
Kak, et al., "Principles of Computerized Tomographic Imaging", Institute of Electrical Engineers, Inc., 1999, in 333 pages.
Kar-Han Tan, Robinson I N, Culbertson B, Apostolopoulos J, 'ConnectBoard: Enable Genuine Eye Contact and Accurate Gaze in Remote Collaboration', In: IEEE Transaction on Multimedia, 2011, June, vol. 13, No. 3, ISSN: 1520-9210.
Kart, M., "Entwicklung und Bau einer neuartigen Mehrfinger-Touchscreen basierend auf frustrierter Totalreflexion," Landeswettbewerb in Bayern 2008 Jugend Forscht, Apr. 1, 2008.

Liu, J., et al. "Multiple touch points identifying method, involves starting touch screen, driving specific emission tube, and computing and transmitting coordinate of touch points to computer system by direct lines through interface of touch screen," 2007, in 25 pages.
Machine translation of CN 108345414A (Year: 2018).
Machine translation of JP 11-85399 (Year: 1999).
Machine translation of KR10-2016-0075643 (Year: 2017).
Mu, Cong et al. "Dielectric multilayer angular filters for coupling LEDs to thin light guides." Proc SPIE 8170 (2011): 817001-1-817001-10.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Notice of Service, *Flatfrog Laboratories AB v. Promethean Ltd. and Promethean Inc.*, C.A. No. 1:19-cv-02246-MN, dated Apr. 23, 2021, in 2 pages.
O'Rourke, Joseph, "Computational Geometry In C", Second Edition, Cambridge University Press, (1998), pp. 252-264.
Panzer, et al., "Tunable Infrared Emission From Printed Colloidal Quantum Dot/Polymer Composite Films on Flexible Substrates", published in Journal of Display Technology, vol. 6, No. 3, Mar. 2010.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Press et al., "Numerical Recipes The Art of Scientific Computing", Third Edition, Cambridge University Press, 2007, pp. 1-1235.
Report on the Filing or Determination of an Action Regarding a Patent or Trademark. For U.S. Pat. No. 10,282,035, U.S. District of Delaware, dated Dec. 10, 2019, in 1 page.
Scheuplein, Robert J., Ph.D. "A Survey of Some Fundamental Aspects of the Absorption and Reflection of Light by Tissue." J. Soc. Cos. Chem. 15 (1964): 111-122.
Summons in a Civil Action to Promethean Inc., C.A. No. 19-2246, dated Dec. 10, 2019 in 2 pages.
Supplementary European Search Report dated Aug. 14, 2015 issued in corresponding European Application No. 13744212.
Supplementary European Search Report for European App. No. EP 13752508, dated Aug. 27, 2015.
Supplementary European Search Report for European App. No. EP 16749542, dated Sep. 17, 2018, in 9 pages.
Ahn, Y., et al., "A slim and wide multi-touch tabletop interface and its applications," BigComp2014, IEEE, 2014, in 6 pages.
Anderson, R. Rox, B.S., and John A. Parrish, M.D. "The Optics of Human Skin." Journal of Investiaative Dermatoloav 77.1 (1981): 13-19.
ASTM International, "Standard Specification for Heat-Treated Flat Glass-Kind HS, Kind FT Coated and Uncoated Glass," Designation: C 1048-04, in 7 pages.
Barzilai et al., "Two-Point Step Size Gradient Methods", IMA Journal of Numerical Analysis, 1988, pp. 141-148.
Bose, R, "Strongly regular graphs, partial geometries and partially balanced designs", Pacific J. Math., vol. 13, No. 2 (1963), pp. 389-419.
British Standard, "Glass in building—Thermally toughened soda lime silicate safety glass," EN 12150- 1:2000, ISBN O 580 36171 3, Aug. 15, 2000, in 28 pages.
Chen. Yhun, "Using micro-structures to couple light into thin light-guides," Master of Science Thesis, Stockholm, 2011.
Chou, N., et al., "Generalized pseudo-polar Fourier grids and applications in regfersting optical coherence tomography images," 43rd Asilomar Conference on Signals, Systems and Computers, Nov. 2009, in 5 paaes.
Civil Cover Sheet *Flatfrog Laboratories AB v. Promethean Ltd. and Promethean Inc.*, dated Dec. 10, 2019, in 1 page.
Complaint for Patent Infringement, *Flatfrog Laboratories AB v. Promethean Ltd. and Promethean Inc.*, C.A. No. 19-2246, dated Dec. 10, 2019, in 83 pages.
Cornelissen, Hugo J. et al. "Injecting Light of High-Power LEDs into Thin Light Guides." Proc. SPIE 7652. International Optical Design Conference (2010): 7652121-7652126.

(56) References Cited

OTHER PUBLICATIONS

Defendants Promethean Ltd. and Promethean Inc.'s Preliminary Proposed Claim Constructions, *Flatfrog Laboratories AB v. Promethean Ltd. and Promethean Inc.*, C.A. No. 1:19-cv-02246-MN, dated May 24, 2021, in 8 pages.
Defendants' Sur-Reply Claim Construction Brief, *Flatfrog Laboratories AB v. Promethean Ltd. and Promethean Inc.*, C.A. No. 1:19-cv-02246-MN, dated Sep. 13, 2021, in 24 pages.
Defendants' Answer to Second Amended Complaint and Defendant Promethean Inc.'s Counterclaims Against FlatFrog Laboratories AB., C.A. No. 19-2246, dated May 22, 2020, in 29 pages.
Defendants' Initial Invalidity Contentions, *Flatfrog Laboratories AB v. Promethean Ltd. and Promethean Inc.*, C.A. No. 1:19-cv-02246-MN, dated Apr. 23, 2021, in 26 pages.
Ericson, Chris, "Real-Time Collision Detection", The Morgan Kaufmann Series in Interactive 30 Technology (2005) Chapters 5-9, pp. 125-412.
European Search Report dated Apr. 19, 2012 issued in European Application No. 09830665.7.
European Search Report dated Jan. 23, 2014 issued in corresponding European Appln. No. 13183545.6.
European Search Report issued in European Application No. 11777650.0, dated Nov. 22, 2013.
Executed Summons in a Civil Action to Promethean Inc., C.A. No. 19-2246, dated Dec. 10, 2019 in 2 pages.
Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 43 pages.
Exhibit 10: Invalidity Claim Chart Against U.S. Pat. No. 10,739,916 Based on International App. Pub. No. WO2014131221 to Chen et al., *Flatfrog Laboratories AB v. Promethean Ltd. and Promethean Inc.*, C.A. No. 1:19-cv-02246-MN, dated Apr. 23, 2021, in 4 pages.
Exhibit 11: Invalidity Claim Chart Against U.S. Pat. No. 10,739,916 Based on Chinese Pub. App. No. 104391611 A to Hu et al., *Flatfrog Laboratories AB v. Promethean Ltd. and Promethean Inc.*, C.A. No. 1:19- cv-02246-MN, dated Apr. 23, 2021, in 4 pages.
Exhibit 12: Invalidity Claim Chart Against U.S. Pat. No. 10,739,916 Based on Chinese Utility Model No. 203786708 U to Cao, *Flatfrog Laboratories AB v. Promethean Ltd. and Promethean Inc.*, C.A. No. 1:19- cv-02246-MN, dated Apr. 23, 2021, in 4 pages.
Exhibit 13: Invalidity Claim Chart Against U.S. Pat. No. 10,739,916 Based on Chinese Utility Model No. 204288179 U to Mo et al., *Flatfrog Laboratories AB v. Promethean Ltd. and Promethean Inc.*, C.A. No. 1:19- cv-02246-MN, dated Apr. 23, 2021, in 4 pages.
Exhibit 2: Invalidity Claim Chart Against U.S. Pat. No. 10,775,935 Based on U.S. Patent No. U.S. Pre-Grant Pub. No. 2019/0235701 to Han et al., *Flatfrog Laboratories AB v. Promethean Ltd. and Promethean Inc.*, C.A. No. 1:19-cv-02246-MN, dated Apr. 23, 2021, in 16 pages.
Exhibit 3A: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246-MN, dated Apr. 23, 2021, in 13 pages.
Exhibit 3B: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246-MN, dated Apr. 23, 2021, in 14 pages.
Exhibit 3C: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246- MN, dated Apr. 23, 2021, in 13 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C. A. No. 1:19-cv-02246-MN, dated Apr. 23, 2021, in 14 pages.
Exhibit 4B: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C.A. No. 1:19-cv-02246-MN, dated Apr. 23, 2021, in 15 pages.
Exhibit 4C: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C.A. No. 1:19-cv-02246-MN, dated Apr. 23, 2021, in 14 pages.
Exhibit 5A: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 13 pages.
Exhibit 5B: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 15 pages.
Exhibit 5C: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 13 pages.
Exhibit 6A: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 9 pages.
Exhibit 6B: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 9 pages.
Exhibit 6C: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 9 pages.
Exhibit 7A: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246- MN, dated Apr. 23, 2021, in 9 pages.
Exhibit 7B: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246-MN, dated Apr. 23, 2021, in 9 pages.
Exhibit 7C: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246-MN, dated Apr. 23, 2021, in 9 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 21 pages.
Exhibit 9: Invalidity Claim Chart Against U.S. Pat. No. 10,739,916 Based on Chinese Utility Model No. CN 203786707 U to Chen et al., *Flatfrog Laboratories AB v. Promethean Ltd. and Promethean Inc.*, C.A. No. 1:19-cv-02246-MN, dated Apr. 23, 2021, in 4 pages.
Extended (Supplementary) European Search Report dated Apr. 30, 2021, issued in counterpart EP application No. 19775915.2. (8 pages).
Extended European Search Report for European App. No. 16743795.3, dated Sep. 11, 2018, in 5 pages.
Extended European Search Report for European App. No. 18772178.2, dated Dec. 10, 2020, in 8 pages.
Extended European Search Report for European App. No. 18772370.5, dated Dec. 9, 2020, in 8 pages.
Extended European Search Report for European App. No. 18774232.5, dated Dec. 21, 2020, in 9 pages.
Extended European Search Report in European Application No. 16873465.5, date Jun. 25, 2019 in 9 pages.
Extended European Search Report in European Application No. 17750516.1, dated Jul. 16, 2019 in 4 pages.
Extended European Search Report in European Application No. 19165019.1, dated Jul. 18, 2019 in 8 pages.
Farghal, et al., "Electromagnetic Modeling of Outcoupling Efficiency and Light Emission in Near-Infrared Quantum Dot Light Emitting Devices", published in Progress In Electromagnetics Research B., vol. 24, 263-284, 2010.

(56) References Cited

OTHER PUBLICATIONS

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Giphy | Stickers | Closer Look Sticker by Cavan Infante, posted on May 24, 2019 by Cavan Infante, no copyright date posted [online], [site visited Oct. 13, 2020], Available from Internet, <URL: https://giphy.com/stickers/circle-underline-cavan-ZbB9ICitwN43fJvNSz/>.

Giphy I Randy, the Badly Drawn Horse, posted on Feb. 12, 2020 by T.L. McBeth, no copyright date posted [online], [site visited Oct. 13, 2020]. Available from Internet, <URL: https://giphy.com/stories/randy-the-badly-drawn-horse-258d6753-fb29/>.

Golub et al: "Matrix Norms" in: "Matrix Computations" Aug. 21, 2005 (Aug. 21, 2005), Johns Hopkins University Press, oaaes 54-59.s.

Hartig, B, "Using a tablet as a whiteboard in MS Teams", 2020, Retrieved from the Internet: URL: https://www.voutube.com/watch?v=CC4991ivXQO, retrieved on Jun. 28, 2023, see video from 0:34-3:53.

Holzammer, Andereas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf.

Horwood, A. et al.: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_1mageNormali zation.pdf*Paae 9, line 1- Paae 14, line 1.

Iizuka, K., "Boundaries, Near-Field Optics, and Near-Field Imaging," Elements of Photonics, vol. 1: In Free Space and Special Media, Wiley & Sons, 2002, in 57 pages.

International Preliminary Report on Patentability received for PCT Patent Application No. PCT/EP2018/052757, mailed on Aug. 15, 2019, 7 pages.

International Preliminary Report on Patentability received for PCT Patent Application No. PCT/EP2019/077054, mailed on Apr. 29, 2021, 7 pages.

International Preliminary Report on Patentability received for PCT Patent Application No. PCT/IB2017/057201, mailed on Jun. 6, 2019, 8 pages.

International Preliminary Report on Patentability received for PCT Patent Application No. PCT/JP2019/001801, mailed on Oct. 15, 2020, 12 pages (6 pages of English Translation and 6 pages of Original Document).

International Preliminary Report on Patentability received for PCT Patent Application No. PCT/SE2009/051364, mailed on Jun. 16, 2011, 11 pages.

International Preliminary Report on Patentability received for PCT Patent Application No. PCT/SE2011/050520, mailed on Nov. 15, 2012, 6 pages.

International Preliminary Report on Patentability received for PCT Patent Application No. PCT/SE2011/050871, mailed on Jan. 17, 2013, 10 pages.

International Preliminary Report on Patentability received for PCT Patent Application No. PCT/SE2012/050086, mailed on Aug. 15, 2013, 8 pages.

International Preliminary Report on Patentability received for PCT Patent Application No. PCT/SE2012/051419, mailed on Jul. 3, 2014, 6 pages.

International Preliminary Report on Patentability received for PCT Patent Application No. PCT/SE2013/050064, mailed on Aug. 14, 2014, 7 pages.

International Preliminary Report on Patentability received for PCT Patent Application No. PCT/SE2013/050137, mailed on Sep. 4, 2014, 6 pages.

International Preliminary Report on Patentability received for PCT Patent Application No. PCT/SE2013/050473, mailed on Nov. 13, 2014, 8 pages.

International Preliminary Report on Patentability received for PCT Patent Application No. PCT/SE2013/050585, mailed on Dec. 4, 2014, 10 pages.

International Preliminary Report on Patentability received for PCT Patent Application No. PCT/SE2013/051044, mailed on Mar. 26, 2015, 7 pages.

International Preliminary Report on Patentability received for PCT Patent Application No. PCT/SE2013/051533, mailed on Jul. 2, 2015, 8 pages.

International Preliminary Report on Patentability received for PCT Patent Application No. PCT/SE2013/051534, mailed on Jul. 2, 2015, 8 pages.

International Preliminary Report on Patentability received for PCT Patent Application No. PCT/SE2013/051537, mailed on Jul. 2, 2015, 9 pages.

International Preliminary Report on Patentability received for PCT Patent Application No. PCT/SE2014/050435, mailed on Oct. 22, 2015, 8 pages.

International Preliminary Report on Patentability received for PCT Patent Application No. PCT/SE2014/050437, mailed on Oct. 22, 2015, 6 pages.

International Preliminary Report on Patentability received for PCT Patent Application No. PCT/SE2014/050438, mailed on Oct. 22, 2015, 6 pages.

International Preliminary Report on Patentability received for PCT Patent Application No. PCT/SE2014/050701, mailed on Jan. 21, 2016, 8 pages.

International Preliminary Report on Patentability received for PCT Patent Application No. PCT/SE2014/051363, mailed on Jun. 2, 2016, 6 pages.

International Preliminary Report on Patentability received for PCT Patent Application No. PCT/SE2015/050041, mailed on Jul. 28, 2016, 10 pages.

International Preliminary Report on Patentability received for PCT Patent Application No. PCT/SE2015/050042, mailed on Jul. 28, 2016, 10 pages.

International Preliminary Report on Patentability received for PCT Patent Application No. PCT/SE2015/050043, mailed on Jul. 28, 2016, 9 pages.

International Preliminary Report on Patentability received for PCT Patent Application No. PCT/SE2015/050044, mailed on Jul. 28, 2016, 8 pages.

International Preliminary Report on Patentability received for PCT Patent Application No. PCT/SE2015/050724, mailed on Jan. 5, 2017, 7 pages.

International Preliminary Report on Patentability received for PCT Patent Application No. PCT/SE2016/050053, mailed on Aug. 10, 2017, 13 pages.

International Preliminary Report on Patentability received for PCT Patent Application No. PCT/SE2016/050098, mailed on Aug. 24, 2017, 9 pages.

International Preliminary Report on Patentability received for PCT Patent Application No. PCT/SE2016/050155, mailed on Sep. 14, 2017, 7 pages.

International Preliminary Report on Patentability received for PCT Patent Application No. PCT/SE2016/051229, mailed on Jun. 21, 2018, 15 pages.

International Preliminary Report on Patentability received for PCT Patent Application No. PCT/SE2017/050102, mailed on Aug. 23, 2018, 9 pages.

International Preliminary Report on Patentability received for PCT Patent Application No. PCT/SE2017/051224, mailed on Feb. 26, 2019, 13 pages.

International Preliminary Report on Patentability received for PCT Patent Application No. PCT/SE2018/050070, mailed on Aug. 22, 2019, 10 pages.

International Preliminary Report on Patentability received for PCT Patent Application No. PCT/SE2018/050109, mailed on Oct. 10, 2019, 12 pages.

(56) References Cited

OTHER PUBLICATIONS

International Preliminary Report on Patentability received for PCT Patent Application No. PCT/SE2018/050817, mailed on Mar. 5, 2020, 9 pages.

International Preliminary Report on Patentability received for PCT Patent Application No. PCT/SE2018/050896, mailed on Mar. 19, 2020, 10 pages.

International Preliminary Report on Patentability received for PCT Patent Application No. PCT/SE2019/050189, mailed on Sep. 17, 2020, 9 pages.

International Preliminary Report on Patentability received for PCT Patent Application No. PCT/SE2019/050190, mailed on Sep. 17, 2020, 8 pages.

Learning and Technology with Frank: Best hardware to use with Microsoft Whiteboard—WACOM, iPad, and Surface, 2021, Retrieved from the Internet: URL: https://www.voutube.com/watch?v=qched3kwhA, retrieved on Jun. 27, 2023, See video from 5:33 to 6:43.

\* cited by examiner

TOUCH-SENSING APPARATUS

TECHNICAL FIELD

The present invention relates generally to the field of touch based interaction systems. More particularly, the present invention relates to a touch sensing apparatus for detecting touch pressure, and a related method.

BACKGROUND ART

In one category of touch-sensitive apparatuses a set of optical emitters are arranged around the perimeter of a touch surface of a panel to emit light that is reflected to propagate across the touch surface. A set of light detectors are also arranged around the perimeter of the touch surface to receive light from the set of emitters from the touch surface. I.e. a grid of intersecting light paths are created across the touch surface, also referred to as scanlines. An object that touches the touch surface will attenuate the light on one or more scanlines of the light and cause a change in the light received by one or more of the detectors. The coordinates, shape or area of the object may be determined by analysing the received light at the detectors. In one category of touch-sensitive apparatuses the light is reflected to propagate above the touch surface, i.e. the intersecting light paths extend across the panel above the touch surface. In some applications it is desirable to utilize the pressure of the interaction object, such as a stylus, against the touch surface for controlling the touch interaction. Such control may be desirable both in terms of varying the display of the touch operations on the screen, such as writing or drawing with different shapes of brushes or patterns, and for controlling different operations of a particular touch application. Previous techniques for such touch control typically rely on complex input devices, such as styluses, having various integrated sensors. This increases the complexity and limits the user's choices input devices. This may hinder the development towards highly customizable and intuitive touch systems.

SUMMARY

An objective is to at least partly overcome one or more of the above identified limitations of the prior art.

One objective is to provide a touch-sensing apparatus which provides for facilitated user interaction and control of touch response, while keeping the cost of the touch interaction system at a minimum.

One or more of these objectives, and other objectives that may appear from the description below, are at least partly achieved by means of touch-sensing apparatuses according to the independent claims, embodiments thereof being defined by the dependent claims.

According to a first aspect a touch sensing apparatus a touch sensing apparatus for detecting touch pressure is provided, comprising a panel that defines a touch surface, the panel having a perimeter, a plurality of emitters arranged along the perimeter, wherein the emitters emit light across the panel, a plurality of detectors arranged along the perimeter, whereby the detectors are arranged to receive at least part of said light as detection light, wherein the touch sensing apparatus is configured to determine a difference in the received detection light between deflection of the panel from a first position ($p_1$) to a second position ($p_2$) along a normal of the touch surface when a touch object deflects the panel, and determine a pressure of the touch object against the touch surface based on said difference.

According to a second aspect a method is provided for detecting touch pressure in a touch sensing apparatus comprising a panel that defines a touch surface, the panel having a perimeter, the method comprising emitting light across the panel with a plurality of emitters arranged along the perimeter, receiving at least part of said light as detection light with a plurality of detectors arranged along the perimeter, determining, as a touch object deflects the panel along a normal of the touch surface, a difference in the received detection light between deflection of the panel from a first position ($p_1$) to a second position ($p_2$) along the normal, and determining a pressure of the touch object against the touch surface based on said difference.

According to a third aspect a computer program product is provided comprising instructions which, when the program is executed by a computer, cause the computer to carry out the steps of the method according to the second aspect.

Further examples of the invention are defined in the dependent claims, wherein features for the first aspect may be implemented for the second aspect, and vice versa.

Some examples of the disclosure provide for a touch sensing apparatus with a facilitated user input.

Some examples of the disclosure provide for increasing a user's choice of touch input devices.

Some examples of the disclosure provide for improving the touch input from a passive stylus.

Some examples of the disclosure provide for a touch sensitive apparatus in which the modelling of pressure when writing or drawing on the touch surface is improved.

Some examples of the disclosure provide for producing a display of touch response with a more accurate brush-like shape.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

These and other aspects, features and advantages of which examples of the invention are capable of will be apparent and elucidated from the following description of examples of the present invention, reference being made to the accompanying drawings, in which.

DETAILED DESCRIPTION OF EXAMPLE EMBODIMENTS

Figure 1A:
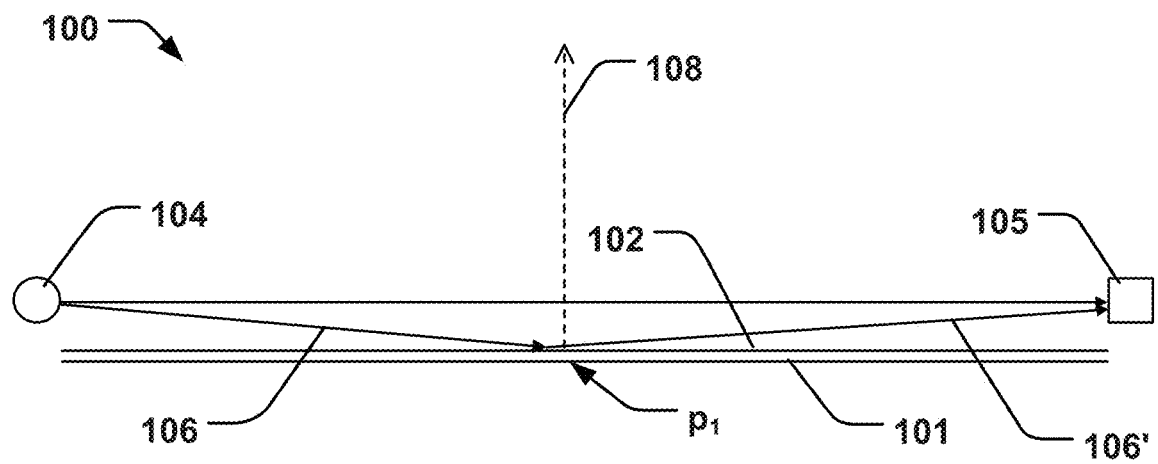
FIGS. 1*a-b* are schematic illustrations, in cross-sectional side views, of a touch sensing apparatus and a panel thereof having two different positions with respect to a normal of the touch surface as a touch object applies pressure to the touch surface (FIG. 1*b*), according to examples of the disclosure.

In the following, embodiments of the present invention will be presented for a specific example of a touch-sensitive apparatus. Throughout the description, the same reference numerals are used to identify corresponding elements.

Figure 2A:
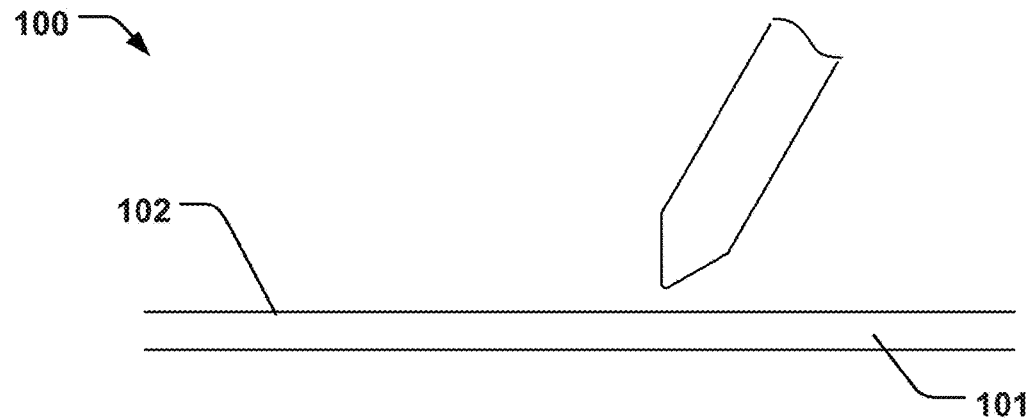
FIGS. 2*a-c* are schematic illustrations, in cross-sectional side views, of a touch sensing apparatus and a panel thereof, having three different positions with respect to a normal of the touch surface as a touch object applies pressure to the touch surface (FIGS. 2*b* and 2*c*), according to examples of the disclosure.
Figure 2B:
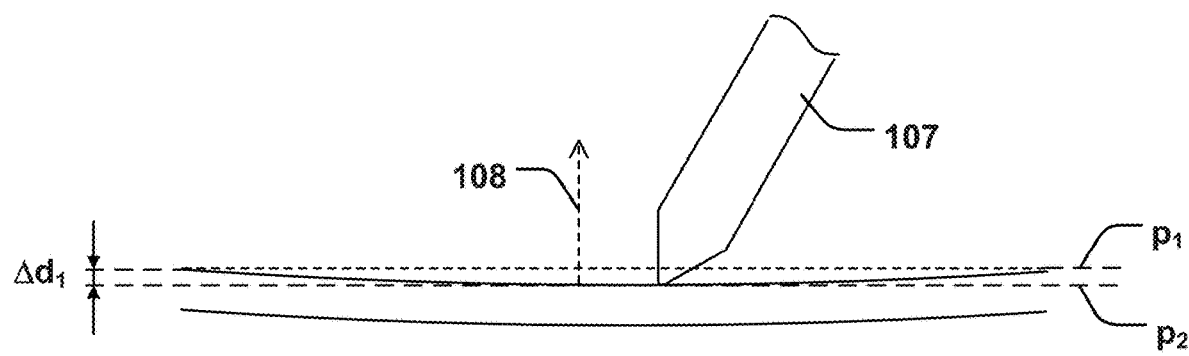
Figure 2C:
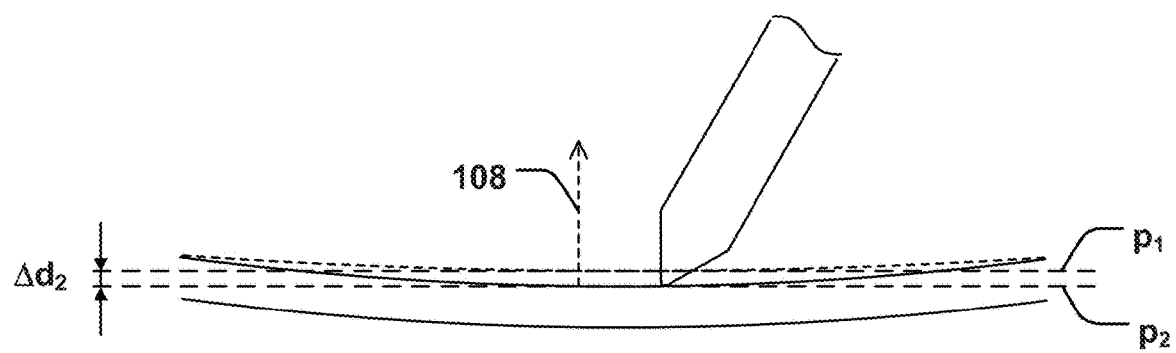
Figure 3:
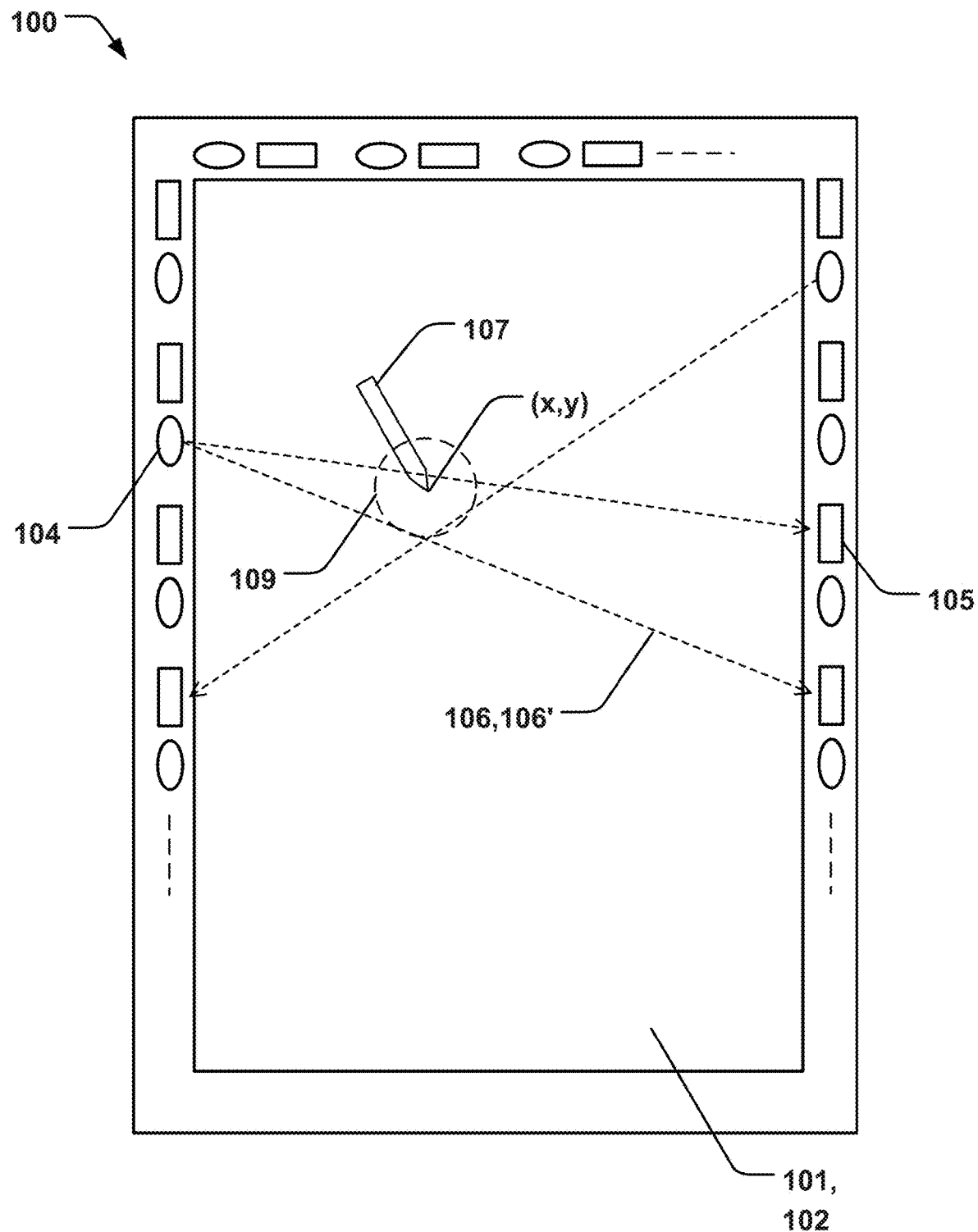
FIG. 3 is a schematic illustration, in a top-down view, of a sensing apparatus, and a touch object in contact with a touch surface thereof, according to one example.

FIGS. 1-2 are schematic illustrations, in cross-sectional side-views, of a touch sensing apparatus 100 and a panel 101 thereof having different positions with respect to a normal 108 of a touch surface 102 of the panel 101, whereas FIG. 3 shows a top-down view of a touch sensing apparatus 100. The touch sensing apparatus 100 thus comprises a panel 101 that defines a touch surface 102. The panel 101 may be designed to be overlaid on or integrated into a display device or monitor (not shown). The panel 101 may be made of any solid material (or combination of materials) such as glass, poly(methyl methacrylate) (PMMA) and polycarbonates (PC).

Figure 1B:
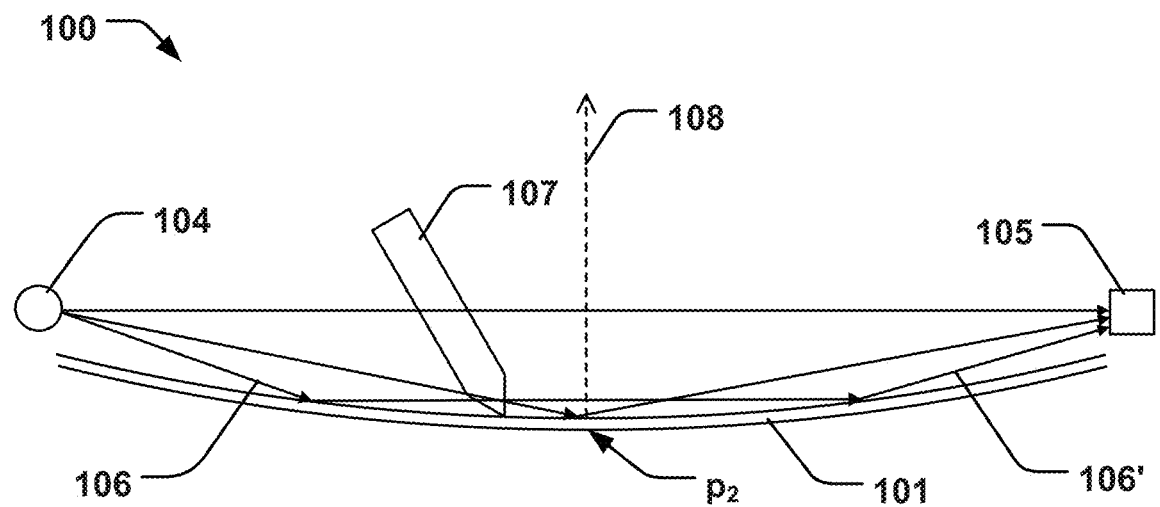

The panel 101 has a perimeter 103. The touch sensing apparatus 100 comprises a plurality of emitters 104 arranged along the perimeter 103, as schematically shown in FIG. 3. The emitters 104 are arranged to emit light 106 across the panel 101. The touch sensing apparatus 100 further comprises a plurality of detectors 105 arranged along the perimeter 103. In use, as the emitters 104 emit light 106, the detectors 105 are arranged to receive at least part of the emitted light as detection light 106'. The schematic side view in FIG. 1a shows the emitted light 106 being reflected against the touch surface 102 as the panel 101 has a first shape or position with respect to a normal 108 of the touch surface 102. Detectors 105 receive at least part of the reflected light, referred to as detection light 106'. FIG. 1b shows a touch interaction object or touch object 107 applying a pressure onto the touch surface 102. The touch object 107 may be a user's hand, a stylus or other object the user utilizes to interact with the touch sensing apparatus 100. The pressure applied by the touch object 107 deflects the panel 101 along the normal 108 of the touch surface 102. The amount of deflection of the panel 101 is exaggerated in the illustration of FIG. 1b for a clearer presentation.

The touch sensing apparatus 100 is configured to determine, as the touch object 107 deflects the panel 101 along the normal 108 of the touch surface 102, a difference in the received detection light 106' between deflection of the panel 101 from a first position ($p_1$) to a second position ($p_2$) along the normal 108. The deflection of the panel 101 along the normal 108 will have effect on the number of reflection paths for the emitted light 106 towards the detectors 105. Thus, the amount of received detection light 106' at the detectors 105 will be affected by the deflection, i.e. the curvature of the panel 101 relative the normal 108. For example, the deflection of the panel 101 from the essentially flat shape in FIG. 1a to the curved shape as schematically illustrated in FIG. 1b, as the touch object 107 applies a force and pressure on the panel 101, increases the number of reflection paths on the touch surface 102 towards the detectors 105. The amount of received detection light 106' at the detectors 105 increases as a result. Likewise, the amount of detection light 106' decreases as the number of reflection paths of the light is reduced, i.e. when the curvature of the panel 101 is reduced, such as moving from the curved shape (FIG. 1b) to a less curved, or essentially flat shape (FIG. 1a), relative the normal 108. Thus, the touch sensing apparatus 100 is configured to determine the difference in the received detection light 106' as the panel 101 moves between positions ($p_1$) and ($p_2$), e.g. as shown in FIGS. 1a-b. As illustrated in FIGS. 1a-b the light 106, 106', propagates above the touch surface 102, i.e. the intersecting light paths extend across the panel 101 above the touch surface 102. The variation in the position and number of reflections on the touch surface 102, as the panel 101 moves, as described above, may thus be utilized for detecting differences in the received detection light 106'. Utilizing the reflections paths on the touch surface 102, as opposed to reflection of light inside the panel 101, provides in examples for a more robust and reliable detection of different pressures on the panel 101, as described further below. A more reliable and facilitated detection is provided as complex considerations of how panel deflection would affect light propagation inside the panel 101 may be dispensed with. Instead, utilizing the reflections paths on the touch surface 102 provides for a direct link between the variation in detection light 106' and the changes in curvature of the touch surface 102, as the panel 101 is deflected by applying different pressures. The emitters 104 may thus be arranged to emit light 106 above the touch surface 102, and the amount of deflection of the panel 101 determines an amount and/or direction of reflection of the light 106 on the touch surface 103. A difference in the received detection light 106' can thus be detected as the deflection varies. I.e. the deflection of the panel 101 determines the difference in the received detection light 106'. FIGS. 2a-c show another example of the panel 101 being deflected along the direction of the normal 108 as a touch object 107 applies a pressure on the panel 101. FIGS. 2a-b show an example similar to the example discussed above in relation to FIGS. 1a-b, i.e. the panel 101 is deflected between a first position $p_1$ (FIG. 2a) where the touch object 107 does not apply a pressure, and a second position $p_2$ (FIG. 2b). The amount of deflection or relative distance between the first and second positions $p_1$, $p_2$, is indicated as $\Delta d_1$ in this example.

FIGS. 2b-c show an example where the pressure applied by the touch object 107 onto touch surface 102 and panel 101 increases from a first pressure value (FIG. 2b) to a second pressure value (FIG. 2c) being higher than the first pressure value. The first position $p_1$ indicated in FIG. 2c corresponds to the second position $p_2$ in FIG. 2b, and the second position $p_2$ in FIG. 2c corresponds to the additional deflection of the panel 101 along the normal 108 as the pressure is increased further. The amount of deflection or relative distance between the first and second positions $p_1$, $p_2$, is indicated as $\Delta d_2$ in this example. As described above, the touch sensing apparatus 100 is configured to determine the difference in the received detection light 106' as the panel 101 moves between positions ($p_1$) and ($p_2$), e.g. as shown in FIGS. 2a-b, and/or as shown in FIGS. 2b-c where the pressure on the panel 101 and the associated variation in the amount of deflection of the panel 101 varies, e.g., as a user applies more or less pressure on the touch surface 102 while maintaining contact with the touch surface 102.

The touch sensing apparatus 100 is configured to determine a pressure of the touch object 107 against the touch surface 102 based on the determined difference in received detection light 106'. Thus, based on the increase or decrease in the amount of received detection light 106', the touch sensing apparatus 100 determines the pressure applied onto the panel 101 and the touch surface 102 thereof. For example, as discussed above, detecting an increase in the amount of received detection light 106' at the detectors 105 can be associated with an increased amount of deflection of the panel 101 along the normal direction 108, e.g. an increase in $\Delta d_1$ or $\Delta d_2$, and an increase in the amount of pressure applied by the touch object 107 on the panel 101. Likewise, detecting a decrease in the amount of received detection light 106' at the detectors 105 can be associated with a decreased amount of deflection of the panel 101 and a decrease in the amount of pressure applied by the touch object 107 on the panel 101. The touch sensing apparatus 100 may thus be configured to control the touch interaction based on the determined variation in pressure. The user may accordingly use any touch object 107 for touch interaction since the pressure onto the touch surface 102 is determined based on the deflection of the panel 101, independently of the type of touch object 107. The user may thus use passive touch objects 107, such as the user's hand, or any passive stylus or brush, without the need of pressure sensors in the touch object 107 itself. This provides for a more intuitive touch interaction and a greater freedom for the user to use individual styluses or brushes.

Figure 4A:
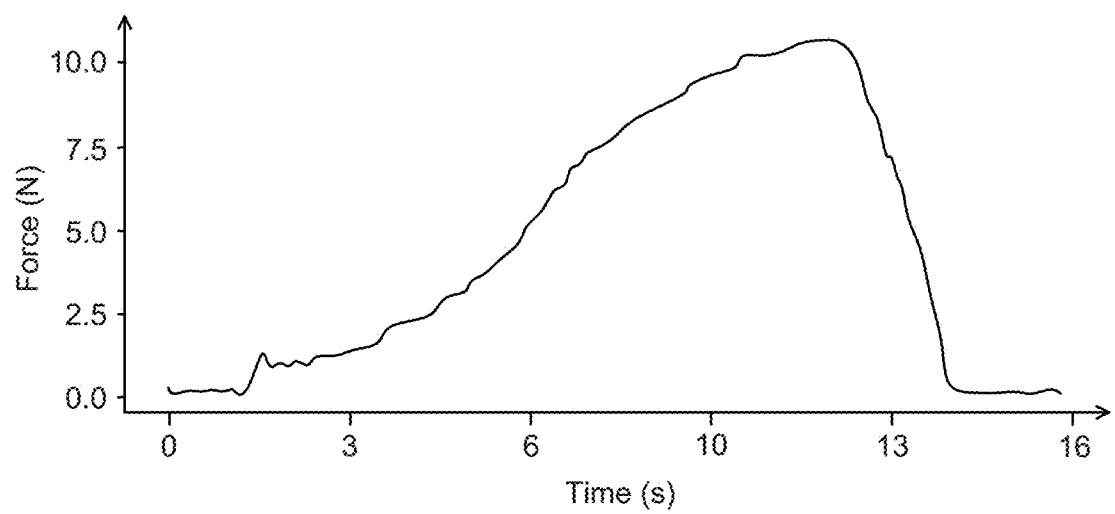
FIGS. 4a-b show diagrams where a varying force is applied onto the touch surface (4a), and resulting pressure values determined from the deflection of the panel (4b), according to one example.
Figure 4B:
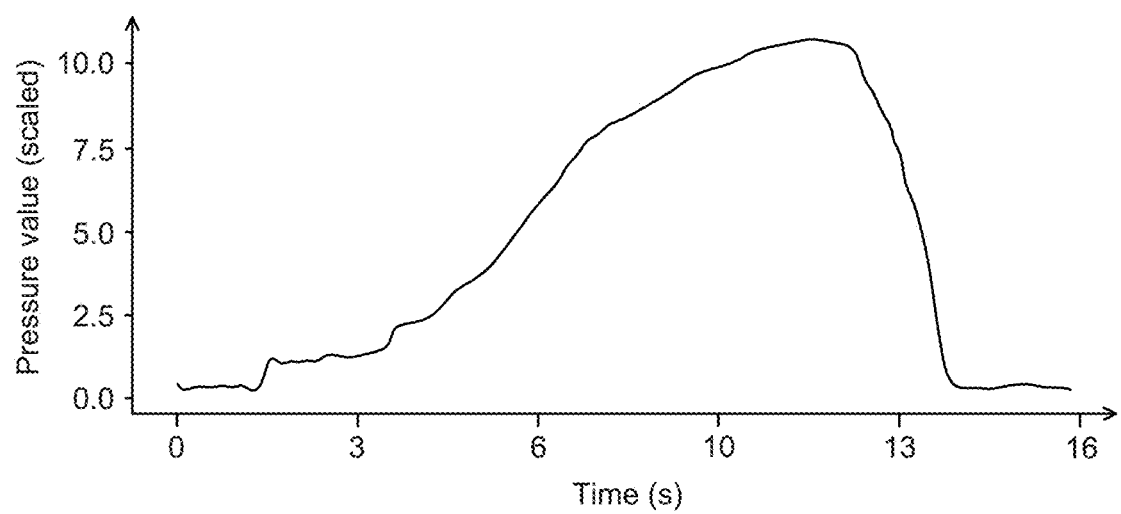

An example is illustrated in FIGS. 4a-b, showing diagrams of a varying force being applied onto the touch surface 102 by a touch object (FIG. 4a), and pressure values determined from the resulting deflection of the panel 101 (FIG. 4b). The force applied by the touch object onto the touch surface 102 is measured by a force sensor connected to the touch object. The applied force progressively increases over a time period before being removed from the touch surface 102, as shown in the diagram of FIG. 4a. Pressure values are continuously determined based on detected differences in the received detection light 106' upon deflection of the panel 101 by the applied force, as shown in the diagram of FIG. 4b. The pressure values have been normalized and scaled to the corresponding minimum and maximum force values from the force sensor on the touch object. The calculated pressure or force values follows the force measured by the force sensor closely over time, both in terms of absolute values and the derivative, i.e. the responsiveness over time to the variations of the applied force. An accurate and responsive detection of pressure on the touch surface 102 is provided.

Detecting the pressure as described above provides for a less complex touch sensing apparatus 100. In addition to the mentioned benefits of utilizing passive touch objects 107, there is further no need to implement pressure sensors along the panel 101 itself. Determining the pressure based on the detected difference in the received detection light 106' thus provides for a robust and facilitated control of touch input based on touch pressure while allowing for a less complex and costly touch sensing apparatus 100. A facilitated control and modelling of the touch response is also provided due to the improved pressure detection, e.g. when modelling the influence of the amount of pressure applied when writing or drawing on the touch surface, such as modelling the dynamics and visual touch response of a brush when the pressure on the brush is varied. The touch sensing apparatus 100 may allow producing a display of a virtual brush with a more accurate brush-like shape in such example.

The touch sensing apparatus 100 may accordingly be configured to output a control signal to display a visual output depending on the pressure, such as a shape of a brush which dynamically varies in size, shape and/or direction depending on the amount of pressure applied. The graphical rendering of strokes from a brush or pen may thus be modified depending on the pressure value. Thickness, opacity or other graphical aspect can be modified. Alternatively, or in addition, the touch sensing apparatus 100 may be configured to control the touch sensing apparatus 100 based on the pressure. A user may for example use a "knocking gesture", as a short high-pressure interaction gesture, which is distinguished from a softer touch on the touch surface 102 to input a control command. Such gesture can be assigned to functions in the application such as moving elements in and out of the background, (un) pinning or (un) locking elements that was knocked on, trigger a "force" that will move graphical elements towards or away from the knock position, trigging a global effect such as "new document", "close document" or other global command. It is conceivable that various other sequences of pressure values can be assigned a special meaning in different touch applications, such as double-clicking by two rapid increases in pressure allows trigging an event without lifting the pen from the surface.

The touch sensing apparatus 100 may be configured to determine the pressure continuously based on detected differences in the received detection light 106' upon deflection of the panel 101. For example, as illustrated in FIGS. 2b-c, and in FIGS. 4a-b, the variation in the received detection light 106' may be continuously determined as a user applies a varying pressure onto the touch surface 102, causing the panel 101 to deflect between varying positions along the normal 108. A continuously increase or decrease in the pressure may thus be determined based on the increasing or decreasing amount of received detection light 106'. This provides for an enhanced touch input interaction with the touch sensing apparatus 100.

The touch sensing apparatus 100 may be configured to determine the pressure based on a difference between received detection light 106' upon deflection of the panel 101 and a reference background signal of detection light 106'. For example, the reference background signal can be determined when the panel 101 has the position shown in FIG. 1a or FIG. 2a, when the touch object 107 does not apply a pressure onto the panel 101. As mentioned above in relation to e.g. FIGS. 2b-c, it is also conceivable that the variation or difference in the detection light 106' is determined for any change in the position of the panel 101 along the normal 108, i.e. for any deflection of the panel 101 as the user interacts with the touch surface 102, to determine an associated variation in the pressure. The touch interaction may then be controlled based on the pressure variation as elucidated above.

The pressure may be determined as being proportional to the aforementioned difference in the detection light 106' being received at the detectors 105. E.g. the pressure may be determined as increasing as the distance $\Delta d_1$ or $\Delta d_2$ in the example of FIGS. 2a-b increases. Vice versa, a decrease in $\Delta d_1$ or $\Delta d_2$ may be determined as an associated decrease in the pressure, since the curvature of the panel 101 and the number of reflection paths of the light towards the detectors 105 decreases. This provides for a less complex, yet effective and robust estimate of the pressure on the panel 101.

For a given difference in the received detection light 106' between a first emitter and a first detector, the pressure may be determined as inversely proportional to a length ($\Delta ed$) between the first emitter and the first detector. For example, turning to FIG. 3, the length between the emitter denoted with reference numeral 104 and the detector denoted with reference numeral 105 may be regarded as the aforementioned length $\Delta ed$. In one example, a difference (v) is detected in the received detection light 106' at detector 105. Considering different lengths ($\Delta ed$) between the current emitter and detector 104, 105, for a given thickness of the panel 101 along normal 108, it may be determined that for shorter lengths (Δed) the panel 101 deflects less, compared to longer lengths (Δed) for the same pressure. I.e. as the length Δed increases the deflection ($\Delta d_1$ or $\Delta d_2$) will increase, given a certain pressure at a location (x,y) on the touch surface 102. Thus, for detected difference (v), the associated pressure (P) may be determined as inversely proportional to the length (Δed), i.e. P∝1/Δed. I.e. as Δed increases less pressure is required to deflect the panel 101 a certain distance ($\Delta d_1$ or $\Delta d_2$). Vice versa, for shorter lengths Δed, a greater pressure is needed to deflect the panel 101 a corresponding distance ($\Delta d_1$ or $\Delta d_2$). This provides for a robust and effective method to take into account the varying lengths between the different light paths between the emitters and detectors 104, 105, for determining the pressure. The light paths, or scan lines, may be represented by a signal matrix, with the signal levels of the light from each emitter to each detector. A pressure may thus effectively be determined for each signal level or light path. Accordingly, the pressure may be determined as inversely proportional to each of the associated lengths (Δed) between the emitters and detector pairs in the signal matrix. The estimated pressure may be determined as a mean value of such individual pressure values.

For a given difference in the received detection light 106', between a first emitter 104 and a first detector 105, the pressure (P) may be determined as inversely proportional to the length Δl between a position (x,y) of the touch object 107 on the touch surface 102 and the first emitter 104, or the first detector 105, i.e. P∝1/Δl. For example, if a pressure is applied close to the perimeter 103, i.e. close to the emitter 104 or detector 105 (thus for a short length Δl), the deflection of the panel 101 is less compared to a case where the same pressure would be applied close to the center of the panel 101, i.e. with an increase in the length Δl. Thus, for detected difference (v), the associated pressure may be determined as inversely proportional to the length (Δl). I.e. as Δl increases less pressure is required to deflect the panel 101 a certain distance ($\Delta d_1$ or $\Delta d_2$). Vice versa, for shorter lengths Δl, a greater pressure is needed to deflect the panel 101 a corresponding distance ($\Delta d_1$ or $\Delta d_2$). The pressure may be determined as inversely proportional to each of the associated lengths (Δl) between the emitters and detector pairs in the signal matrix.

The pressure may be determined as proportional to the aforementioned difference (v) divided by Δed*Δl; P(k)=v/(Δed*Δl), where k is the number of scanlines. An estimated pressure may be determined as a mean value of the individual pressure values P(k) of the scanlines.

The length Δl may be chosen as the minimum of; the distance between the position (x,y) of the touch object 107 on the touch surface 102 and the first emitter 104, and the distance between said position (x,y) and the first detector 105.

The touch sensing apparatus 100 may be configured to define a region of interest 109 around a position (x,y) of the touch object 107 on the touch surface 102. The region of interest 109 may be a defined area around a currently determined coordinate (x,y) where the touch object 107 contacts the touch surface 102. The coordinate (x,y) may be determined based on the attenuation of the light as the touch object touches the touch surface 102, as described in the introductory part of the present disclosure. The touch sensing apparatus 100 may be configured to determine the aforementioned difference (v) for light passing through the region of interest 109, between respective pairs of emitters 104 and detectors 105. I.e. the difference (v) in the received detection light 106' at the detectors 105, as the touch object 107 applies a pressure on the panel 101, is determined for scanlines passing through the region of interest 109. The touch sensing apparatus 100 may be configured to determine an averaged pressure based on the determined differences (v) for the pairs of emitters and detectors associated with the scanlines passing through the region of interest 109. This provides for a more effective determination of the pressure, as it is not necessary to determine the difference (v) for the entire signal matrix. The amount of deflection of the panel 101 along the normal 108 can be regarded as being largest around the touch coordinate (x,y) where the pressure is applied.

The touch sensing apparatus 100 may be configured to determine a first estimate of a pressure at a touch position (x,y) on the touch surface 102. The touch sensing apparatus 100 may be configured to calculate a detection light signal difference (v') based on the first estimate of the pressure. The touch sensing apparatus 100 may be configured to solve the pressure by iteratively minimizing a differential between a measured value of the difference (v) in the received detection light 106' and the calculated detection light signal difference (v'). I.e. a detection light signal difference (v') is calculated for different candidate pressure values until |v−v'| is minimized and the best candidate for the pressure is obtained. The pressure may be iteratively determined at a plurality of positions ($x_1 \ldots x_n, y_1 \ldots y_n$) on the touch surface 102, e.g. when a plurality of pressure points is applied on the touch surface 102 by a user's hand or other touch objects 107. The plurality of touch positions ($x_1 \ldots x_n, y_1 \ldots y_n$) may be determined by the light attenuation as described in the introductory part of the present disclosure. Thus, the associated pressure ($p_1 \ldots p_n$) at the plurality of touch positions ($x_1 \ldots x_n, y_1 \ldots y_n$) may be determined iteratively as described above. This determination may be done for each scanline in the signal matrix or for a subset of the scanlines in the region of interest 109. The starting guess for ($p_1 \ldots p_n$) may be based on the last calculated pressure for the respective positions in a previous frame, for contact points that was present in such previous frame. For new pressure point interactions, a typical pressure value is assigned as starting guess. It should be noted that although reference is made to determining a pressure throughout the disclosure, it should be understood that this is analogous to determining a force, in which case a conversion factor is applied to convert between pressure and force values.

The touch sensing apparatus 100 may be configured to determine a deflection of the panel 101 along the normal 108 resulting from the first estimate of the pressure at the touch position (x,y). The touch sensing apparatus 100 may be configured to calculate the detection light signal difference (v') resulting from such deflection. The deflection resulting from the different candidates of pressure values may be determined by analytical expressions, for given geometries of the panel 101, and/or by FEM-based numerical methods, and/or by empirically by applying known forces to a particular configuration of the touch sensing apparatus 100 and panel 101 and storing the parameters of the resulting model. The corresponding deflection resulting from the pressure estimates may thus be determined, as well as the associated detection light signal difference (v') resulting from corresponding shapes of the panel 101 for these deflection values. The influence of the deflection and shape of the panel 101 on the number of reflection paths of the light 106, 106', towards the detectors 105 and resulting detection light signal difference (v') may be determined by different models, analogous to the above discussion, e.g. by analytical, numerical and/or empirical models. Once the detection light signal difference (v') is calculated, the pressure may be iteratively determined by minimizing |v−v'| as described above.

The touch sensing apparatus 100 may be configured to determine the detection light signal difference (v') based on a plurality of reference detection light signal differences resulting from a respective plurality of reference pressures on the touch surface 102. The reference detection light signal differences may be determined empirically. The best candidates of the associated reference pressures may thus be identified, which minimizes |v−v'|, to obtain the best estimate of the pressure. It is also conceivable that a plurality of reference detection light signal differences and a plurality of reference pressures are utilized in look-up tables to directly identify the best estimate of the pressure based on the currently measured signal difference (v). In one example, the closest comparing look-up tables may be interpolated to obtain the best estimate of the pressure.

The touch sensing apparatus 100 may be configured to determine an amount of deflection of the panel 101 along the normal direction 108 based on the pressure. As mentioned above, the deflection may be determined by analytical, numerical and/or empirical models. The amount of deflection and current shape of the panel 101 may be utilized for optimizing the touch detection, e.g. to improve accuracy and/or resolution of the touch detection, and/or to provide characteristics and diagnostics data of the touch sensing apparatus 100, such as the panel 101 and related components for attaching the panel 101 to frame elements of the touch sensing apparatus 100.

The touch sensing apparatus 100 may be configured to determine a vibration amplitude and/or a vibration frequency of the panel 101 based on a determined variation of the pressure over time. I.e. the deflection of the panel 101 may be a result of mechanical vibrations of the panel 101, which may in turn originate from other components of the touch sensing apparatus 100, and/or from motions in the environment surrounding the touch sensing apparatus 100. The vibration characteristics may be utilized for optimizing the touch detection, e.g. to improve accuracy and/or resolution of the touch detection, and/or to provide characteristics and diagnostics data of the touch sensing apparatus 100. In another example, the panel 101 may be assumed to vibrate with a particular default frequency, such as 10 Hz. If there has not been an interaction on the touch surface 102 recently, the source of the vibration can be assumed to originate from the environment around the touch sensing apparatus 100. Such vibration sources can be the on/off state of machinery nearby, a person walking (low amplitude) or jumping (higher amplitude). The vibration events detected in this way may be detected as "gesture", such as a "jump gesture". For example, in a touch application such as a game application, such "jump gesture" may trigger an in-game event. In another example, vibrations in a stand on which the touch sensing apparatus 100 may be mounted may result in a slower vibration, e.g. in the 1-2 Hz range. For variable height stands, the frequency of the slower stand oscillations can be used to estimate the current height of the stand.

Figure 5:
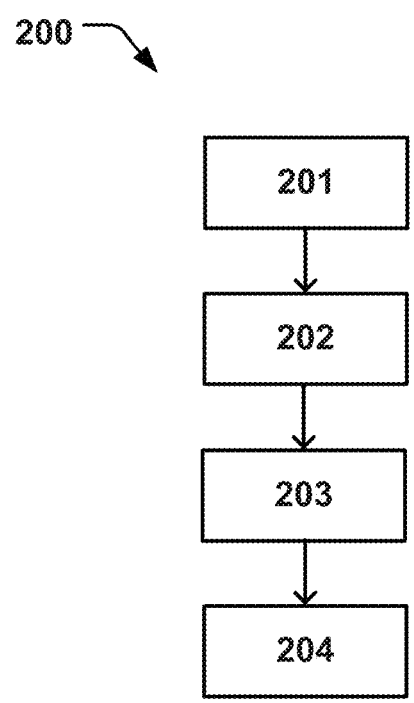
FIG. 5 is a flowchart of a method for detecting touch pressure in a touch sensing apparatus

FIG. 5 shows a flowchart of a method 200 for detecting touch pressure in a touch sensing apparatus 100. The touch sensing apparatus 100 comprises a panel 101 that defines a touch surface 102. The panel 101 has a perimeter 103. The method 200 comprises emitting 201 light 106 across the panel 101 with a plurality of emitters 104 arranged along the perimeter 102. The method 200 comprises receiving 202 at least part of said light as detection light 106' with a plurality of detectors 105 arranged along the perimeter 103. The method 200 comprises determining 203, as a touch object 107 deflects the panel 101 along a normal 108 of the touch surface 102, a difference in the received detection light 106' between deflection of the panel 101 from a first position ($p_1$) to a second position ($p_2$) along the normal 108. The method 200 comprises determining 204 a pressure of the touch object 107 against the touch surface 102 based on said difference. The method 200 provides for the advantageous benefits as described for the touch sensing apparatus 100 in relation to FIGS. 1-4 above. The method 200 provides for facilitated user interaction and control of touch response in the touch sensing apparatus 100, while keeping the cost of the touch interaction system at a minimum.

A computer program product is provided comprising instructions which, when the program is executed by a computer, cause the computer to carry out the steps of the method 200 as described above in relation to FIG. 5.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims. For example, the specific arrangement of emitters and detectors as illustrated and discussed in the foregoing is merely given as an example.

The invention claimed is:

1. A method for detecting touch pressure in a touch sensing apparatus comprising a panel that defines a touch surface, the panel having a perimeter, the method comprising:
   emitting light across the panel to be reflected against the touch surface with a plurality of emitters arranged along the perimeter,
   receiving at least part of said light as detection light with a plurality of detectors arranged along the perimeter,
   determining, as a touch object deflects the panel along a normal of the touch surface and changes a curvature of the panel, a difference in the received detection light between deflection of the panel from a first position to a second position along the normal, and
   determining a pressure of the touch object against the touch surface based on said difference.

2. The method according to claim 1, comprising determining the pressure continuously based on detected differences in the received detection light upon deflection of the panel.

3. The method according to claim 1, comprising determining the pressure based on a difference between received detection light upon deflection of the panel and a reference background signal of detection light.

4. The method according to claim 1, wherein the pressure is determined as being proportional to said difference.

5. The method according to claim 1, wherein the pressure, for a given difference in the received detection light between a first emitter and a first detector, is determined as inversely proportional to a length between the first emitter and the first detector.

6. The method according to claim 1, wherein the pressure, for a given difference in the received detection light between a first emitter and a first detector, is determined as inversely proportional to a length between a position of the touch object on the touch surface and
   the first emitter, or
   the first detector.

7. The method according to claim 1, wherein the pressure is determined as proportional to the difference divided by $\Delta ed*\Delta l$.

8. The method according to claim 7, wherein a length $\Delta l$ is a minimum of; a first distance between a position of the touch object on the touch surface and the first emitter, and a second distance between said position and the first detector.

9. The method according to claim 1, comprising defining a region of interest around a position of the touch object on the touch surface, determining said difference for light passing through the region of interest, between respective pairs of emitters and detectors, determining an averaged pressure based on the determined differences for the pairs of emitters and detectors.

10. The method according to claim 1, comprising determining a first estimate of a pressure at a touch position on the touch surface, calculating a detection light signal difference based on the first estimate, solving the pressure by iteratively minimizing a differential between a measured value of the difference in the received detection light and the calculated detection light signal difference.

11. The method according to claim 10, comprising determining a deflection of the panel along the normal resulting from the first estimate of the pressure at the touch position, calculating the detection light signal difference resulting from the deflection.

12. The method according to claim 1, comprising determining a detection light signal difference based on a plurality of reference detection light signal differences resulting from a respective plurality of reference pressures on the touch surface.

13. The method according to claim 1, comprising outputting a control signal to display a visual output depending on the pressure, and/or controlling the touch sensing apparatus based on the pressure.

14. The method according to claim 1, comprising determining an amount of deflection of the panel along a normal direction based on the pressure.

15. The method according to claim 1, comprising determining a vibration amplitude and/or a vibration frequency of the panel based on a determined variation of the pressure over time.

16. The method according to claim 1, wherein the emitters are arranged to emit light above the touch surface, and wherein the deflection of the panel determines an amount and/or direction of reflection of the light on the touch surface and the difference in the received detection light.

* * * * *